(12) United States Patent
D'Amico

(10) Patent No.: US 11,568,562 B1
(45) Date of Patent: Jan. 31, 2023

(54) SELF-TRACKED CONTROLLER

(71) Applicant: Meta Platforms Technologies, LLC, Menlo Park, CA (US)

(72) Inventor: Samuel Redmond D'Amico, San Francisco, CA (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 278 days.

(21) Appl. No.: 16/994,329

(22) Filed: Aug. 14, 2020

Related U.S. Application Data

(60) Provisional application No. 62/888,432, filed on Aug. 16, 2019.

(51) Int. Cl.
   - *G06F 3/01* (2006.01)
   - *G06T 7/00* (2017.01)
   - *G06T 7/73* (2017.01)
   - *H04N 13/239* (2018.01)
   - *H04N 5/225* (2006.01)

(52) U.S. Cl.
   CPC .............. *G06T 7/73* (2017.01); *G06T 7/97* (2017.01); *H04N 5/2253* (2013.01); *H04N 13/239* (2018.05); *G06F 3/011* (2013.01); *G06T 2207/30244* (2013.01)

(58) Field of Classification Search
   None
   See application file for complete search history.

(56) References Cited

U.S. PATENT DOCUMENTS

| | | | | |
|---|---|---|---|---|
| 10,373,342 B1* | 8/2019 | Perez, III | .............. | G06F 3/0346 |
| 10,838,515 B1* | 11/2020 | Yitzhak | .................... | G06T 7/73 |
| 2013/0278631 A1* | 10/2013 | Border | ................... | G06Q 30/02 |
| | | | | 345/633 |
| 2015/0235447 A1* | 8/2015 | Abovitz | ............... | G01B 11/303 |
| | | | | 345/633 |
| 2015/0286275 A1* | 10/2015 | Huang | .................. | A63F 13/843 |
| | | | | 345/156 |
| 2016/0378861 A1* | 12/2016 | Eledath | ................. | G06T 19/006 |
| | | | | 707/766 |

(Continued)

OTHER PUBLICATIONS

Andersen et al., "AR HMD Guidance for Controlled Hand-Held 3D Acquisition," IEEE Transactions on Visualization and Computer Graphics, vol. 25, No. 11, date of publication: Aug. 13, 2019 (Year: 2019).*

*Primary Examiner* — Soo Shin

(74) *Attorney, Agent, or Firm* — Greenberg Traurig, LLP

(57) ABSTRACT

The disclosed system may include a housing dimensioned to secure various components including at least one physical processor and various sensors. The system may also include a camera mounted to the housing, as well as physical memory with computer-executable instructions that, when executed by the physical processor, cause the physical processor to: acquire images of a surrounding environment using the camera mounted to the housing, identify features of the surrounding environment from the acquired images, generate a map using the features identified from the acquired images, access sensor data generated by the sensors, and determine a current pose of the system in the surrounding environment based on the features in the generated map and the accessed sensor data. Various other methods, apparatuses, and computer-readable media are also disclosed.

20 Claims, 13 Drawing Sheets

(56) References Cited

U.S. PATENT DOCUMENTS

2017/0195629 A1* 7/2017 Wexler .................. G06F 16/583
2018/0300897 A1* 10/2018 Woods .................. G06T 19/006
2018/0329516 A1* 11/2018 Steedly .................. A63F 13/53

* cited by examiner

SELF-TRACKED CONTROLLER

CROSS-REFERENCE TO RELATED APPLICATIONS

This application claims priority to and the benefit of U.S. Provisional Patent No. 62/888,432, filed on Aug. 16, 2019, the disclosure of which is incorporated by reference herein in its entirety.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
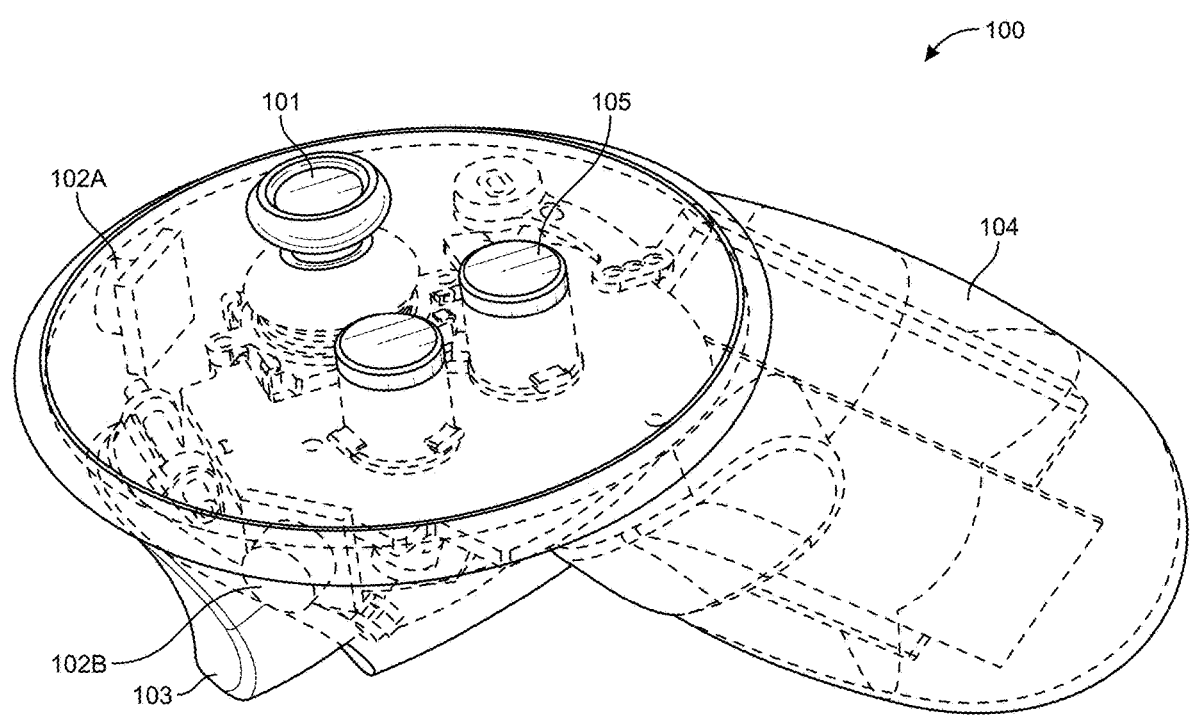
FIG. 1 illustrates a perspective view of an exemplary self-tracking system.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to a self-tracking system, apparatus, or peripheral device. The self-tracking peripheral device may be configured to track itself in open space using cameras mounted in various locations on the peripheral device. In at least some embodiments, the self-tracking peripheral device may track itself without relying on line of sight with any other cameras, sensors, or other external systems. For example, in some cases, the self-tracking peripheral device may be used in conjunction with an artificial-reality device that includes a head-mounted display (HMD). In such cases, the self-tracking peripheral device may be configured to track its position in space without having line of sight to the HMD of the artificial-reality device or to any other device (e.g., another peripheral device). While chiefly described in relation to a gaming controller herein, it will be understood that the self-tracking peripheral device may be produced in a variety of different form factors including watches, wristbands, gloves, game controllers, or other peripheral devices.

In many traditional artificial-reality systems, handheld controllers are used to interact with artificial objects in an artificial environment (e.g., a virtual reality (VR) environment or an augmented reality environment (AR)). The position of these handheld controllers is typically tracked using one of two methods: 1) an outside-in approach where the environment in which the artificial-reality device is used includes cameras and other sensors to observe the handheld controllers from the outside and track their movements, or 2) an inside-out approach where cameras are positioned in the HMD of the artificial-reality system to track movement of the handheld controllers from the perspective of the user wearing the HMD. Both of these systems may involve gathering output from multiple different cameras (typically at least four), and both methods may require line of sight between the cameras in the room or between the camera mounted in the HMD and the controllers.

The present disclosure, in contrast, describes a variety of approaches to producing and implementing a self-tracking peripheral device capable of tracking itself without any external cameras or sensors. The self-tracking peripheral device may be designed to track its movements and determine its position in free space using one, two, three, or more cameras mounted to the self-tracking peripheral device. These cameras may be embedded in various positions on the peripheral device. Because fewer cameras are used than in conventional approaches, the cameras are less likely to be accidentally occluded by the user's fingers or by other objects. As such, the self-tracking peripheral device is more likely to work properly in a variety of different situations and under different types of use.

FIG. 1, for example, illustrates one embodiment of a peripheral device 100. The peripheral device 100 is designed to fit in the palm of a user's hand and facilitate interaction with one or more other systems including computer systems, artificial reality systems, video game consoles, or other electronic systems. The peripheral device 100 may include cameras 102A and/or 102B. The cameras may be configured to capture images of the environment surrounding the peripheral device 100. This environment may be indoors, outdoors, in large enclosures or small enclosures, or in other locations. The cameras 102A/102B may be substantially any type of image capturing device that includes a lens and an electronic photon detector (e.g., a charge coupled device (CCD)). The cameras 102A/102B may be configured to store the image data captured in their images on a data store within the peripheral device 100 (e.g., a solid-state memory) or may be configured to transmit the image data to a remote data store or computer system.

The peripheral device 100 may include a housing 104 that provides an external and/or internal structure for the peripheral device. The housing 104 may be configured to provide internal or external mounting points for various buttons, electronic hardware components (e.g., cameras 102A/102B, batteries, radios, processors, memory, haptic elements, etc.), or other components. The housing may, for example, provide a support structure for buttons 105, trigger 103, and joystick 101. The joystick 101, trigger 103, and buttons 105 may be used to provide inputs to a remotely connected computer system such as a gaming console. It will be understood here that the peripheral device 100 may include substantially any number of buttons, joysticks, touchpads, switches, or other means of providing input including microphones for voice inputs. Furthermore, the peripheral device 100 may be assembled and/or produced in substantially any shape or size, and in many different button and joystick configurations.

Figure 2:
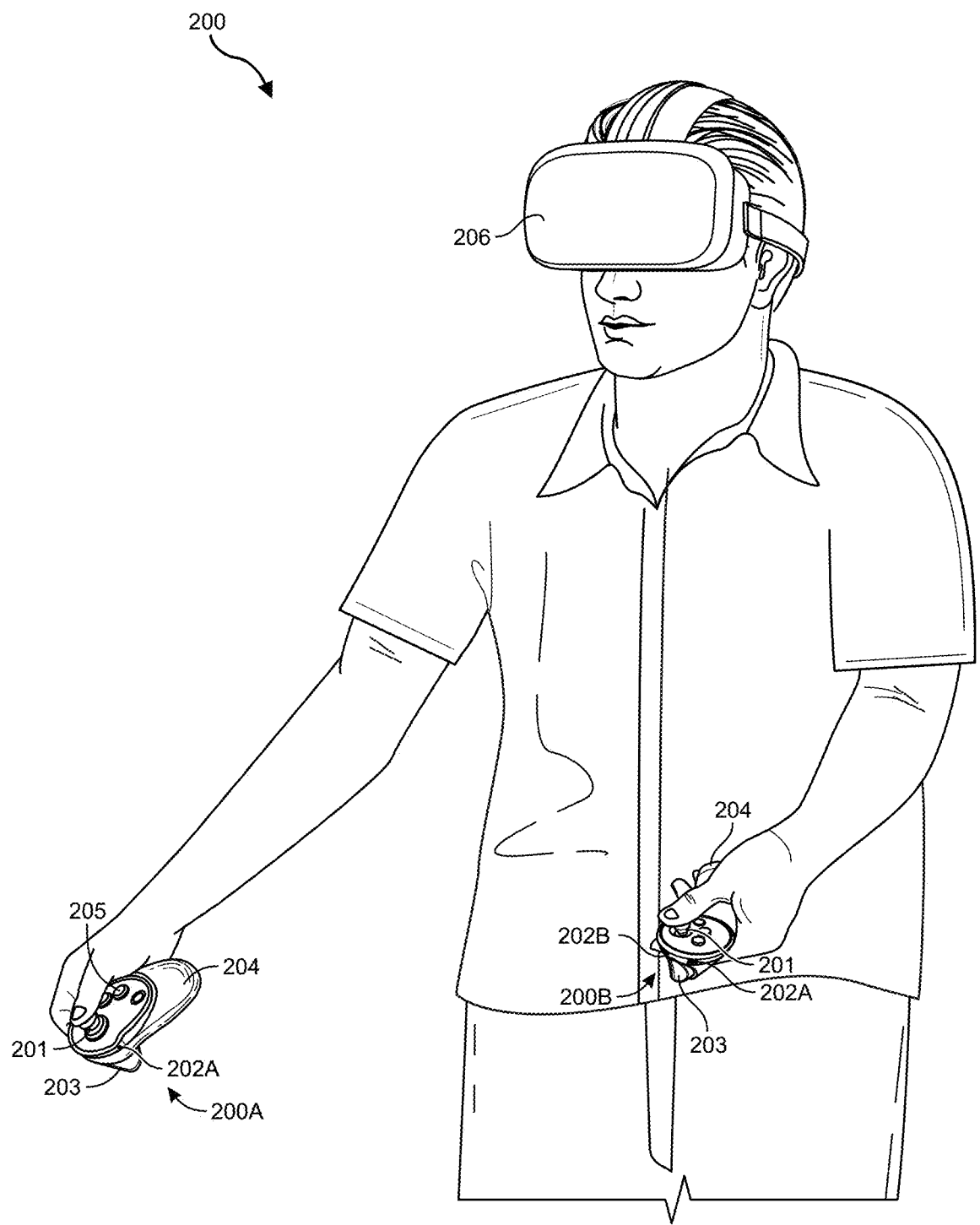
FIG. 2 illustrates a perspective view of a user using a self-tracking system and artificial reality headset.

As shown in FIG. 2, alternative self-tracking peripheral devices 200A/200B may be provided that include the same or different hardware components than those of peripheral device 100 of FIG. 1. For example, the self-tracking peripheral device 200A may include a handle 204 and trigger 203, along with a joystick 201 and buttons 205 for interacting with objects in an artificial environment or in a user interface. The self-tracking peripheral device 200A may also include one or more cameras 202A and/or 202B. In some cases, the self-tracking peripheral device 200A may only include one camera, while in other cases, the peripheral device 200A may include two, three, or more cameras. The cameras 202A/202B may be substantially any type of camera, including wide-angle cameras with a large field of view or other types of cameras described below. Additionally or alternatively, the self-tracking peripheral device 200A may include optical sensors, acoustic sensors (e.g., sonar), time of flight sensors, light emitters or sensors, global positioning system (GPS) modules, inertial measurement units (IMUs), and other sensors. Any or all of these sensors may be used alone or in combination to provide input data to the self-tracking peripheral device 200.

The cameras 202A/202B may be positioned substantially anywhere on the self-tracking peripheral device 200A/200B. In some embodiments, the cameras may be positioned at angles offset from each other (e.g., 30 degrees, 40 degrees, 50 degrees, 60 degrees, 70 degrees, 80 degrees, or 90 degrees offset from each other). This offset may allow the cameras to capture different portions of the physical environment in which the self-tracking peripheral device 200 is being used. In some cases, the cameras 202A/202B may be positioned to avoid occlusions from a user's hand, fingers, or other body parts.

For example, the cameras 202A/202B may be configured to capture portions of a room including the walls, floor, ceiling, objects within the room, people within the room, or other features of the room. Similarly, if the self-tracking peripheral device 200A/200B is being used outdoors, the cameras 202A/202B may be configured to capture images of the ground, the sky, or the 360-degree surroundings of the device. The images may be used in isolation or in combination to determine the device's current location in space. For instance, the images may be used to determine distances to objects within a room. Movements between sequences of subsequently taken images may be used to calculate which direction the devices 200A/200B have moved and how fast the devices have moved relative to their surroundings. The images may be used to determine the location of another peripheral device (e.g., a second controller (e.g., 200B) in the user's other hand). The images may also be used to capture portions of the user who is using the peripheral device 200A including the user's hand, fingers, arm, torso, legs, face, head, or other body parts. The self-tracking peripheral device 200A may use images of these body parts to determine its location relative to the user and relative to other objects in the room including walls, doors, floor, and ceiling, without relying on any other outside cameras or sensors to determine its location.

In some embodiments, the self-tracking peripheral devices 200A/200B may communicate with a headset 206. The headset 206 may include a display and one or more computing components. These computing components may be configured to generate and present a display to the user. The display may include a user interface and content such as video content, web content, video game content, etc. The computing components in the headset 206 may also be configured to generate map data. For example, the computing components in the headset 206 may receive inputs from sensors worn by the user or mounted on the headset and use that sensor data to create a map of the user's environment. This map data may be shared with the self-tracking peripheral devices 200A/200B. In some embodiments, the self-tracking peripheral devices 200A/200B may use this map data when determining their location or, in some cases, may combine the map data received from the headset 206 with their own generated map data. In some cases, the self-tracking peripheral devices 200A/200B may generate a map of their environment without using sensor data or map data from any other sources.

Figure 3:
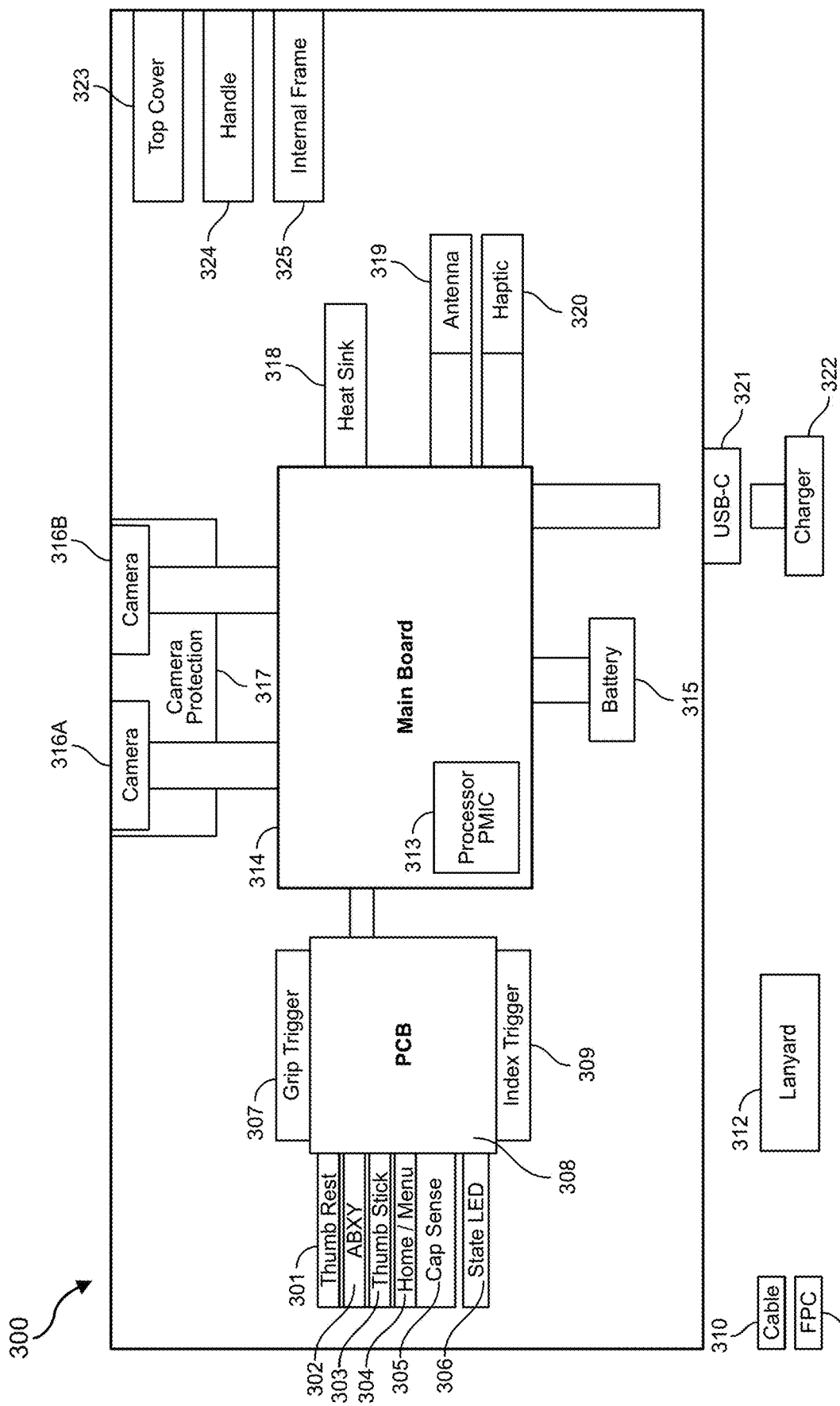
FIG. 3 illustrates a block diagram of components that may be implemented in a self-tracking system.

The self-tracking peripheral device 200A may also include other electronic components, both on its exterior and on its interior. For example, as shown in block diagram 300 of FIG. 3, the self-tracking peripheral devices 200A/200B may each include a main board 314 and processor 313 connected to a battery 315, a heat sink 318, an antenna 319, haptic components 320, cameras 316A/316B (potentially within a camera protection casing 317), and potentially other printed circuit boards (e.g., PCB 308) along with components connected to those PCB. For instance, the PCB 308 may be configured to process inputs from the grip trigger 307, thumb rest sensor 301, ABXY buttons 302, and joystick/thumb stick 303, home/menu buttons 304, capacitance sensors 305 (e.g., track pads), index triggers 309, as well as interface with other devices though USB port 321 and control state light emitting diodes (LEDs) 306.

In some cases, the self-tracking peripheral may also include an internal frame 325, a top cover 323, and a handle 324, which the user uses to hold the peripheral. The top cover 323 may also include a ringlet through which a lanyard 312 may be threaded to additionally secure the peripheral to the user's hand. The battery 315 of the peripheral device may be charged via USB port 321 by a battery charger 322. In some cases, the peripheral device may also be linked to a flexible printed circuit (FPC 311) via a cable 310. Other components may also be implemented as part of the self-tracking peripheral device. The main board 314 and other PCBs (e.g., 308) or other computing components may be configured to perform some or all of the computing to determine the device's current location. In other embodiments, the self-tracking peripheral devices 200A/200B may communicate with other devices (e.g., headset 206) to assist in performing the computing.

Figure 4:
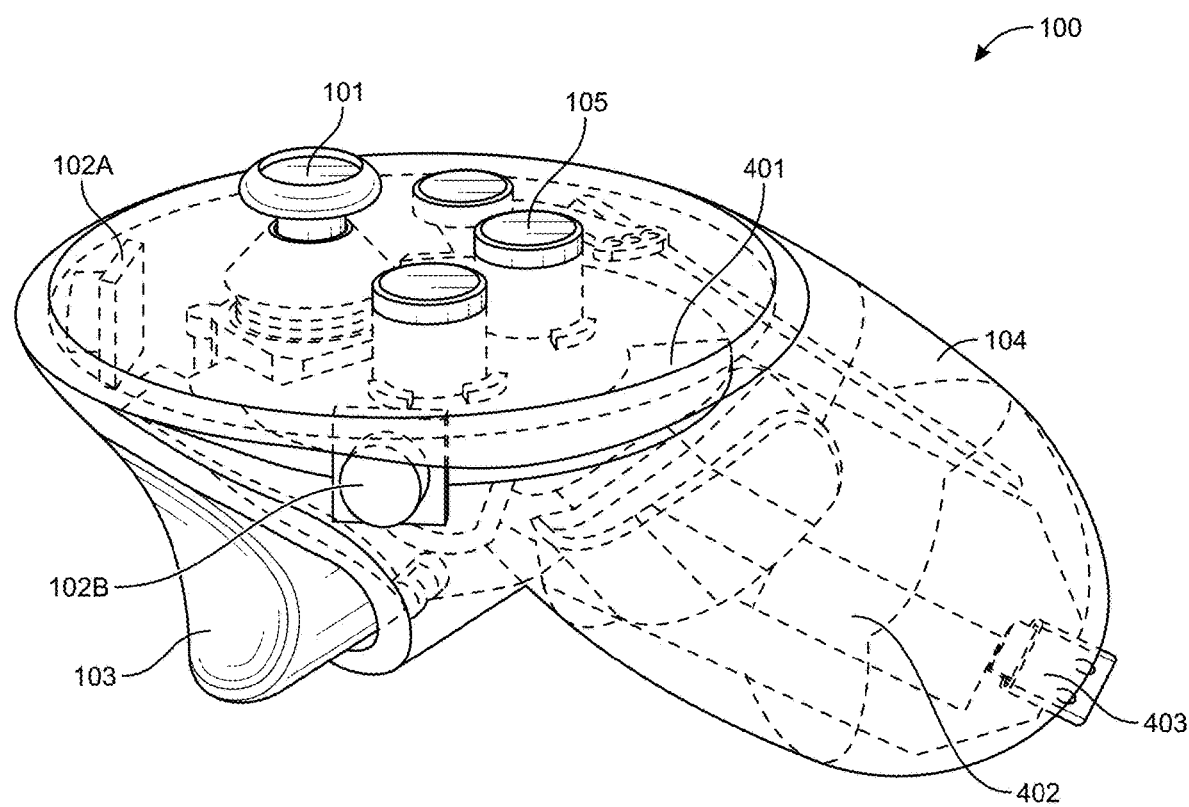
FIG. 4 illustrates a perspective view of an alternative self-tracking system.

In some cases, the electronic components of the self-tracking peripheral 200A/200B may further include a communications module that communicates with a head-mounted display of an artificial-reality system. The antenna 401 of FIG. 4 may be part of this communications module. The communications module may transmit and receive communications from a corresponding communications module on an artificial-reality device. The internal electronics may also include a haptics component 402 that provides vibration, buzzing, or other tactile feedback to the user, as well as a USB port 403 for charging or for connecting to other peripheral devices or computer systems. The internal electronics may further include an imaging module including at least one camera (e.g., 316A/316B) that is configured to acquire images of the environment surrounding the controller. Moreover, the internal electronics of the self-tracking peripheral device may include a tracking module configured to track the location of the controller in free space using the images acquired by the camera(s). The PCB 308 and/or the main board processor 313 may then analyze the images to track the location of the self-tracking peripheral device without having line of sight between the peripheral device and any main processing or sensing components of an external artificial-reality system.

In some cases, a pair of self-tracking peripheral devices may be used simultaneously. For instance, if a user is wearing a pair of gloves, each glove may include its own cameras (see cameras 906A/906B of FIG. 9), or if the user wearing wristbands on each hand, the wristbands may include their own cameras (see cameras 1036A/1036B of FIG. 10). These cameras (e.g., 316A/316B) of FIG. 1, may be used to capture images of the peripheral device's current surroundings. Each peripheral device may process the images that it captures with its cameras using the main board processor or a purpose-built processor. Additionally or alternatively, each peripheral device may share image data with the other peripheral devices. Accordingly, two peripheral devices may share images with each other, or a wristband or smartwatch may share images with a glove, or a glove may share images with a watch, or a watch may share images with a gaming controller, etc. As such, each peripheral device may capture its own images and may combine those images with other images received via the communications module. These images may be pieced together to determine depth, determine relative locations, determine coordinates in space, or to otherwise calculate the peripheral device's exact or relative location in space. Each peripheral device may thus determine its location on its own, or may determine its location in relation to other peripheral devices using imaging data from those devices.

In some cases, a self-tracking peripheral device may begin tracking its location using two or more cameras. Once the self-tracking peripheral device has established its location in space, the tracking may continue using fewer cameras. Thus, if the self-tracking peripheral device (e.g., 100 of FIG. 1) started tracking its location using three cameras, the self-tracking peripheral device may transition to tracking its location using two cameras or using one camera. Similarly, if the self-tracking peripheral device started tracking its location using two cameras, once calibrated or once an initial map has been created, the self-tracking peripheral device may continue tracking its location using a single camera. If the self-tracking peripheral device loses its position in space or becomes unaware of its exact location (due to loss of signal from a camera, for example), two or more additional cameras may be initiated to assist in re-determining the device's location in space.

In some embodiments, each peripheral device may be configured to access the image data taken by its cameras (and perhaps additionally use image data from cameras on other peripheral devices) to create a map of the surrounding environment. The map may be created over time as subsequent images are taken and processed. The map may identify objects within an environment and may note the location of those objects within the environment. As time passes, and as the peripheral devices change locations, additional images may be taken and analyzed. These additional images may indicate where the user is in relation to the identified objects, what the distance is between the user and the objects, what the distance is between the peripheral device and the user, and what the distance is between the peripheral device and any other peripheral devices that may be in use. Calculated distances between objects may be refined over time as new images are captured and analyzed. Thus, the map of the environment around the peripheral device may be continually updated and improved. Moreover, if objects (e.g., people) within the environment move to different locations, the updated map may reflect these changes.

Because the peripheral device's location is determined solely using the images captured by the peripheral device itself, and does not depend on outside cameras or sensors, the peripheral device is truly self-tracking. The peripheral device does not need any outside sensors or cameras or other devices to determine, by itself, its own location in free space. Implementations using a single camera may be produced and may function using the camera data from a single camera. In other implementations, two cameras may be used. By using only one or two cameras, the cost and complexity of the peripheral device may be reduced, as well as reducing its weight and increasing battery life as there are fewer components to power. Still further, with fewer cameras, it is less likely that one of the cameras will be occluded and provide faulty (or no) information.

Because the peripheral device may be held by a user, and because the peripheral device may determine its own location independently, the peripheral device may also be able to determine the position, location, and pose of the user holding the device. The cameras on the peripheral device may have wide angle lenses that may capture portions of the user's body. From these images, the peripheral device may determine how the user's body is positioned, which direction the user's body is moving, and how far the body part is away from the peripheral device. Knowing this distance and its own location in free space may allow the peripheral device to calculate the location of the user holding the device. Moreover, in some embodiments, the wide-angle cameras may capture images of the user's face and eyes. These images may allow the peripheral device to track the movements of the user's eyes and determine where the user intends to move or determine what the user is looking at. Knowing where the user is within the environment and knowing where the user is likely to move, along with the knowledge of its own location, the peripheral device may generate warning beeps or buzzes to keep the user from running into objects within the environment.

Still further, because the cameras on the peripheral device may be continuously capturing image data, some portions of that data may be redacted or blurred for privacy reasons. For instance, users within a room in which peripheral devices are being used may not wish to be recorded, or the owner of a property may not wish to have certain portions of their property recorded. In such cases, the peripheral device may be configured to identify faces or objects in the images and blur those faces or objects. Additionally or alternatively, the image data may be used for calculations and then immediately discarded. Other privacy implications may be administered via policies.

Figure 5:
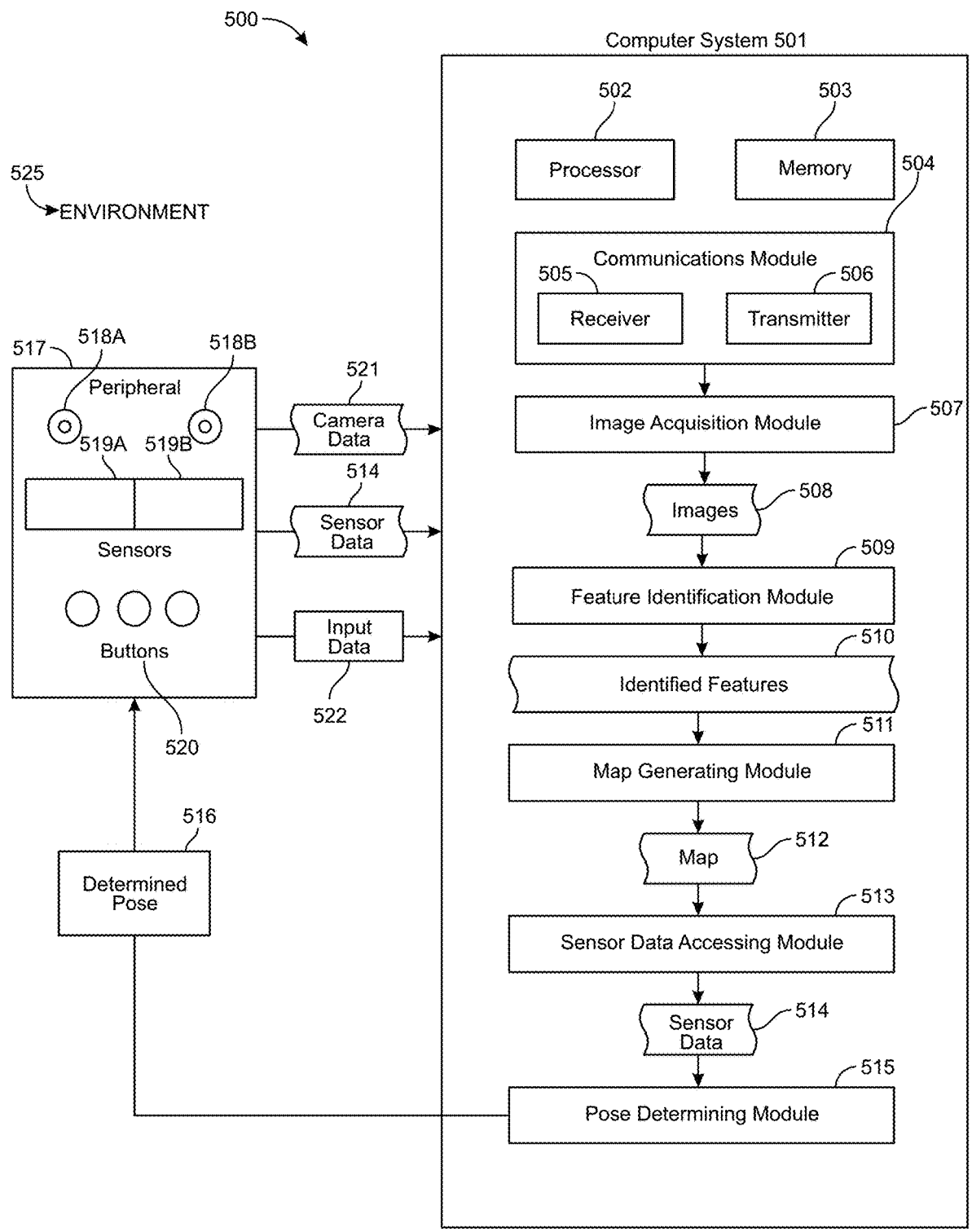
FIG. 5 illustrates a computer system that may be used in conjunction with interacts with a self-tracking system.

FIG. 5 illustrates a computing environment 500 in which a computer system 501 communicates with a self-tracking peripheral device 517 (or simply "peripheral device 517" herein). In some cases, the computer system 501 (or portions thereof) is embedded within the peripheral device 517, while in other cases, the computer system (or portions thereof) is separate from the peripheral device 517. The computer system 501 may be substantially any type of computer system including a local computer system or a distributed (e.g., cloud) computer system. The computer system 501 includes at least one processor 502 and at least some system memory 503. The computer system 501 also includes program modules for performing a variety of different functions. The program modules are hardware-based, software-based, or include a combination of hardware and software. Each program module uses computing hardware and/or software to perform specified functions, including those described herein below.

For example, the communications module 504 communicates with other computer systems or peripheral devices. The communications module 504 includes wired or wireless communication means that receive and/or transmit data to or from other computer systems or peripheral devices. These communication means may include hardware radios including, for example, a hardware-based receiver 505, a hardware-based transmitter 506, or a combined hardware-based transceiver capable of both receiving and transmitting data. The radios may be WIFI radios, cellular radios, Bluetooth radios, global positioning system (GPS) radios, or other types of radios. The communications module 504 interacts with databases, mobile computing devices (such as mobile phones or tablets), embedded or other types of computing systems.

In some cases, the processor 502 may comprise a graphics processing unit (GPU) or may be communicatively linked to a GPU. The GPU may be any type of purpose-built processor including a dedicated chipset, a combined CPU/GPU chipset, a discrete hardware unit, or other type of graphics processing unit. Such a GPU may include multiple processors, multiple cores, dedicated memory, high-capacity bridges, and other associated hardware. In some cases, the GPU may be used to perform feature identification on an image. Thus, a GPU may be part of feature identification module 509 or may be in communication with feature identification module. Indeed, after the image acquisition module 507 has acquired one or more images 508 of the surrounding environment 525 (e.g., using cameras 518A and/or 518B), the feature identification module 509 may analyze the images 508 to identify one or more features in the images. The feature identification module 509 then passes these identified features 510 to the map generating module 511 which begins generating a map of the surrounding environment 525. The map generating module 511 may then pass this map 512 to the pose determining module 515, along with sensor data 514, so that the pose determining module 515 may determine the current pose of the peripheral device 517. These steps will be explained further below with regard to the computing environment 500 of FIG. 5 and with regard to method 600 of FIG. 6.

Figure 6:
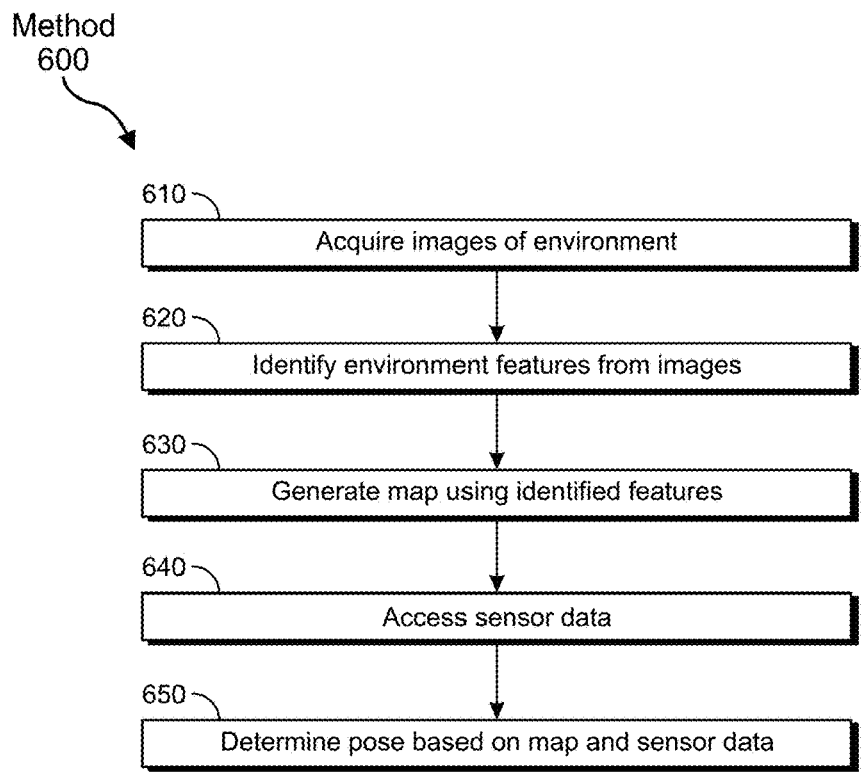
FIG. 6 illustrates a method for self-tracking a peripheral device's position in space.

FIG. 6 is a flow diagram of an exemplary computer-implemented method 600 for self-tracking a peripheral device's position in space. The steps shown in FIG. 6 may be performed by any suitable computer-executable code and/or computing system, including the system illustrated in FIG. 6. In one example, each of the steps shown in FIG. 6 may represent an algorithm whose structure includes and/or is represented by multiple sub-steps, examples of which will be provided in greater detail below.

As illustrated in FIG. 6, at step 610, one or more of the systems described herein may acquire images of a surrounding environment using a camera mounted to a housing. For instance, image acquisition module 507 of computer system 501 may acquire images 508 using cameras 518A and/or 518B. The cameras, as noted above, may be substantially any type of cameras including wide angle cameras. The cameras 518A/518B transfer their camera data 521 to the computer system 501, and the image acquisition module 507 sends the images 508 to the feature identification module 509. In some cases, the image acquisition module 507 is also configured to access image data from other cameras on other peripheral devices (e.g., from cameras on a watch, on a headset (e.g., 206 of FIG. 2), on another controller (e.g., 200B), or on another device. As such, the image acquisition module 507 may not only acquire images from the peripheral device 517, but potentially also from other devices. Moreover, in some cases, the image acquisition module 507 may access stored images from a data store.

Once the images 508 have been accessed, the feature identification module 509 may identify one or more features of the surrounding environment 525 from the acquired images at step 620 of FIG. 6. The feature identification module 509 may be configured to perform object analyses to identify objects within the images and, in some cases, assign semantic definitions to those objects (i.e., identify what those objects are). In other cases, the feature identification module 509 may be configured to identify distinct points or items in the image without actually determining what those objects are. The feature identification module 509 may be configured to piece together the various images to determine depth, to determine relative locations, to determine coordinates in space, or to otherwise calculate the device's exact or relative location in space. In some cases, the self-tracking peripheral device 517 initially establishes its location in space using multiple cameras, and then continues updating (or reacquires) its position using a single camera. In other cases, the self-tracking peripheral device 517 initially establishes its location in space using a single camera and then transitions to using multiple cameras to update its position or to reacquire its position.

Thus, if the self-tracking peripheral device 517 started tracking its location using three cameras, the self-tracking peripheral device may transition to tracking its location using two cameras or using one camera. Similarly, if the self-tracking peripheral device 517 started tracking its location using two cameras (e.g., 518A/518B), once calibrated or once an initial map has been created, the self-tracking peripheral device 517 may continue tracking its location using a single camera. If the self-tracking peripheral device loses its position in space or becomes unaware of its exact location (due to loss of signal from a camera, for example), two or more additional cameras may be initiated to assist in re-determining the device's location in space. In some cases, the self-tracking peripheral device 517 may generate a map of its environment using solely its own sensor data (i.e., sensor data from sensors mounted on or within the self-tracking peripheral device), without using sensor data or map data from any external sources. In other cases, the self-tracking peripheral device 517 may receive sensor data and/or map data from other sources (e.g., a head-mounted device) and may combine that information with its own sensor and map data to create a richer, more detailed map.

Once the feature identification module 509 has identified various features in the images 508, the map generating module 511 may generate at least a portion of a map using the identified features 510 identified from the acquired images 508 at step 630 of FIG. 6. The map may be a two-dimensional or a three-dimensional map, and may include identified features and their location in the surrounding environment 525. The map may include X, Y, Z coordinates for each of the identified features 510. Then, as the peripheral device 517 is moved from one position to another, the feature identification module 509 may determine, based on differences in the images, that the peripheral device 517 has moved relative to the identified features 510. Using distances between identified features in different images, the computer system 501 may determine how far and/or how fast the peripheral device 517 has moved relative to the identified features on the map 512. The sensor data accessing module 513 may also access sensor data 514 (at step 640 of FIG. 6) sent from one or more sensors 519A/519B (e.g., acoustic sensors (e.g., sonar), time of flight sensors, IMUs, etc.) and provide the sensor data to the pose determining module 515. The pose determining module 515 may then determine a current pose 516 (at step 650 of FIG. 6) of the peripheral device 517 based on the identified features 510 in the generated map 512 in combination with the accessed sensor data 514. Using this combination of information, the peripheral device 517 may track itself in space without having line of sight (or even communication with) other peripheral devices or other computer systems.

As time passes, and as the peripheral device 517 changes locations, additional images may be taken and analyzed. These additional images may indicate where the user is in relation to the identified objects. The additional images may also be analyzed by the computer system 501 to determine the distance between the user and the identified features 510, to determine the distance between the peripheral device 517 and the user, and/or to determine the distance between the peripheral device and any other peripheral devices that may be in use (e.g., peripheral device 200B or headset 206 of FIG. 2). The determined distances between identified objects or features may be refined over time as new images are captured and analyzed. The computer system 501 may also use these subsequent images to update the generated map 512. For example, the computer system 501 may analyze the images to determine that the peripheral device 517 has moved relative to the identified features 510 and, in other cases, may use the updated images to determine that one or more of the identified features has moved relative to the peripheral device 517. For instance, an identified feature may be another person or an object such as a cell phone or a chair or other movable object. Thus, the map of the environment around the peripheral device 517 may be continually updated to show movement of identified objects and features within that environment.

In some cases, the cameras 518A/518B on the peripheral device 517 may have wide angle lenses that may capture portions of the user's body. From these images, the peripheral device may determine how the user's body is positioned, which direction the user's body is moving, and how far the body part is away from the peripheral device. Knowing this distance and its own location in free space may allow the peripheral device to calculate the location of the user holding the device, the wide-angle cameras may capture images of the user's face and eyes. These images may allow the peripheral device to track the movements of the user's eyes and determine where the user intends to move or determine what the user is looking at. Knowing where the user is within the environment and knowing where the user is likely to move, along with the knowledge of its own location, the peripheral device may generate warning beeps or buzzes to keep the user from running into objects within the environment. Because the peripheral device may be held by a user, and because the peripheral device may determine its own location independently, the peripheral device may also be able to determine the position, location, and pose of the user holding the device.

Figure 7:
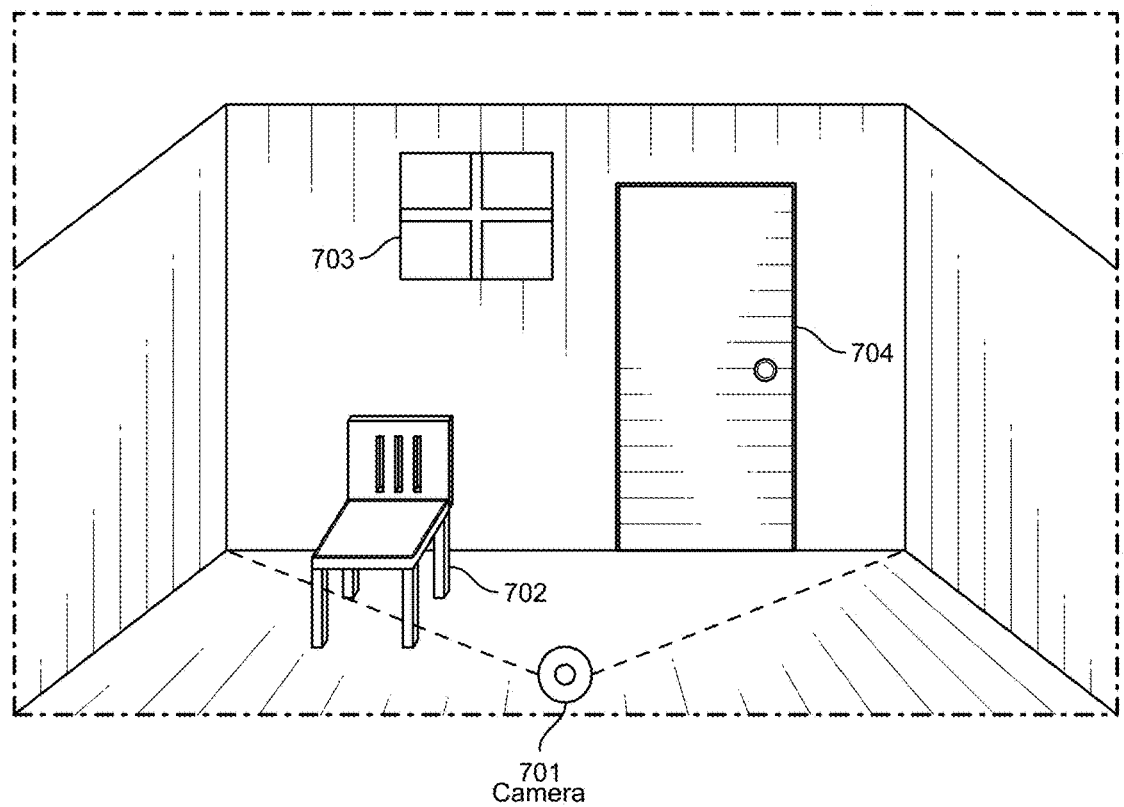
FIG. 7 illustrates an embodiment in which a self-tracking system triangulates its position within an environment.

In some embodiments, the processor 502 of computer system 501 implements one or more computer vision algorithms to identify the features in the acquired images 508. For example, the computer system 501 may be configured to locally or remotely process incoming images 508 and other camera data 521 from the cameras 518A/518B of the peripheral device 517. The computer vision algorithms may be configured to identify objects or features within an image. In some cases, the objects or features may be semantically identified as being a chair 702, for example, as shown in FIG. 7, or a door 704, or a window 703. In other cases, the computer vision algorithms may simply recognize shapes or straight lines or intersecting lines, or circles or other similar features. In some cases, the computer vision algorithms identify features within an environment and then triangulate the peripheral device 517 to one or more of those identified features 510 in the acquired images. This may provide depth measurements, as well as assist in determining the device's position in free space.

The camera 701 may continue capturing images of the chair 702, the window 703, the door 704, and other objects within a room or outdoor space and, in combination with IMU or other sensor data 514, determine a current pose (i.e., a current position in free space and orientation of the peripheral device 517). For instance, if the peripheral device 517 is a gaming controller and a user is holding the device to play a video game, the user may be pushing buttons 520 or moving the controller in other ways to provide inputs 522 that translate to in-game movements. These in-game movements may be affected by the current position and/or orientation of the controller. Thus, the pose determining module 515 of computer system 501 may determine and continually redetermine a current pose 516 of the peripheral device 517, including its position in free space and/or its orientation in terms of yaw, pitch, and roll.

In some embodiments, the peripheral device 517 includes at least two cameras and potentially three or four cameras. In such cases, the processor 502 may implement images 508 captured by the at least two cameras 518A/518B as part of a two-camera baseline to identify a three-dimensional (3D) position of a specified feature of the environment. The processor 502 (which, as mentioned above, may include a local processor and/or remote processors on a remote (e.g., cloud) computer systems) may analyze images from both cameras simultaneously and, by comparing the two images, may generate a three-dimensional map (e.g., 512) of the surrounding environment 525. The images from the respective cameras 518A/518B may also be used to determine the 3D position of the peripheral device 517 in free space. As the peripheral device 517 is moved around and as new features are identified in these images, the computer system 501 may continue to add these features to the generated map 512 and create a richer and more detailed map. Having a more detailed map may help to ensure that finer movements of the peripheral device 517 are captured and identified. This may lead to more precise movements within a video game or other application being used in conjunction with the peripheral device 517.

Figure 8:
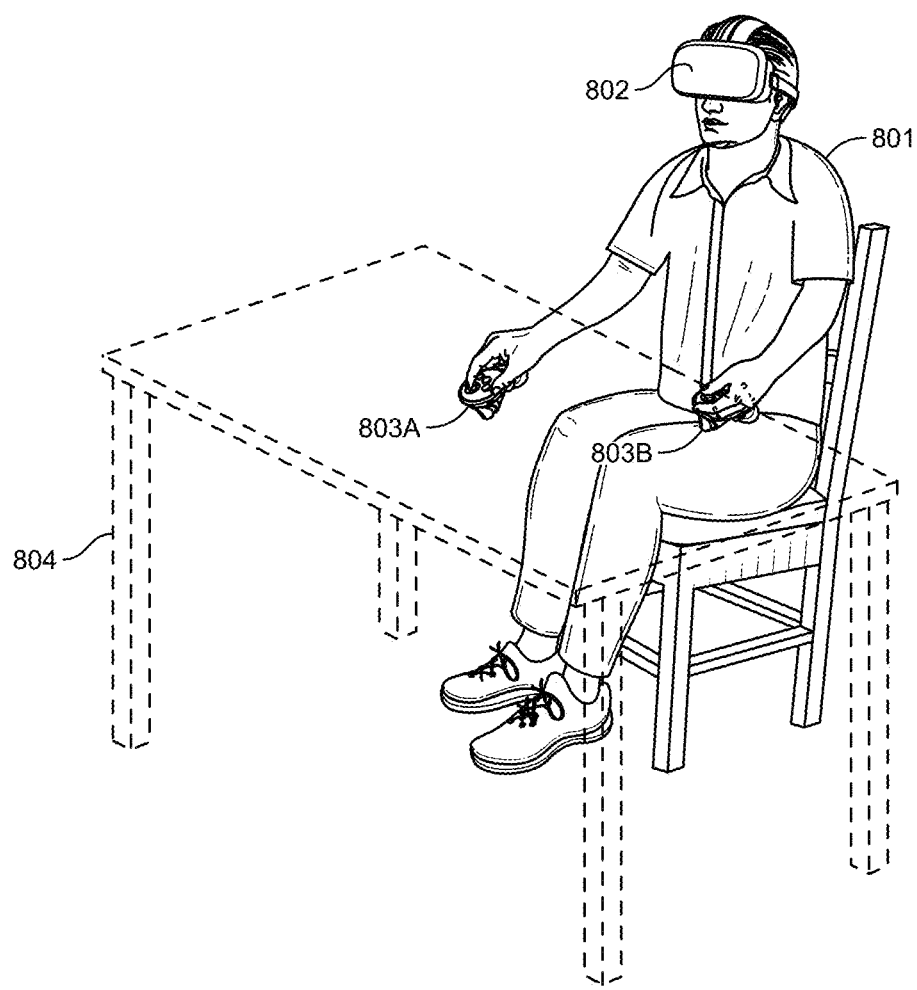
FIG. 8 illustrates an embodiment in a self-tracking system determines its position in space without line of sight to other peripheral devices.

In some embodiments, as noted in regard to FIG. 2, the peripheral devices 200A and/or 200B may be used in conjunction with an augmented reality head-mounted display (e.g., 206). In some cases, the head-mounted display 206 (or simply "headset 206" herein) may be part of an artificial-reality system. This artificial reality system may include the peripheral devices 200A/200B, or may be a separate artificial reality system. In some cases, as shown in FIG. 8, the peripheral devices 803A/803B (which may be the same as or different than peripheral devices 200A/200B) may be under a desk (e.g., 804) or may be under a blanket or other covering and, as such, may not have line of sight to the head-mounted display 802. In such cases, cameras on the peripheral devices 803A/803B may not be able to see the head-mounted display 802, and may have no direct communication with the HMD. Accordingly, the peripheral devices 803A/803B may perform their own feature identification, mapping, and pose determination while underneath the desk, with no line of sight to external cameras or other sensors that may be part of the head-mounted display 802. As the user 801 moves the peripheral devices 803A/803B, each device determines its current pose within the environment based on the identified features, the sensor data from each device's sensors, and the generated map, without line of sight between the peripheral devices and the HMD 802.

In some cases, even without having line of sight to each other, the peripheral devices 803A/803B may still be in communication with each other (e.g., via Bluetooth, WiFi, cellular, or other radios). In such cases, the head-mounted display 802 may send portions of a map of the surrounding environment to the peripheral devices 803A/803B. The peripheral devices 803A/803B may use all or portions of the map sent from the head-mounted display 802 to determine its current pose. In some embodiments, the computer system 501 of FIG. 5 may determine whether various conditions exist that would cause the peripheral devices 803A/803B to consult portions of an alternative map of the surrounding environment (e.g., the map sent from the head-mounted display 802). Such conditions may include an inability to identify features, an inability to orient properly, an inability to determine a current pose, etc. Upon determining that at least one of the conditions exists, the peripheral devices 803A/803B may access at least a portion of the alternative map of the surrounding environment and use that map to assist in determining a current pose of the peripheral devices. This alternative map of the surrounding environment may be generated by the artificial-reality system that powers or is run on the head-mounted display 802.

In some cases, the conditions indicate that the map generated by the artificial reality system is to be used by itself to determine the current pose of the peripheral devices 803A/803B. Alternatively, conditions may indicate that some of the map generated by the artificial reality system is to be used in conjunction with the map generated by the peripheral devices 803A/803B. And, in still other cases, conditions may indicate that none of the map generated by the artificial reality system is to be used, and that the map generated by the peripheral devices 803A/803B is solely to be used to determine the current pose of the peripheral devices 803A/803B. These conditions may change continually, and over any given time period, the peripheral devices 803A/803B may transition from using solely their own generated maps, to using a portion of their own maps and a portion of the artificial reality system's map, to using solely the artificial reality system's map. Thus, based on the instantaneous current conditions, the peripheral devices 803A/803B may change (and then change again) between different maps of the surrounding environment. This map data may be used in conjunction with any sensor data received from the sensors on the peripheral devices 803A/803B to determine and continually update the device's current pose. Furthermore, the map data may be used in conjunction with any image data received from the peripheral devices 803A/803B.

In some embodiments, an apparatus is provided which includes a housing dimensioned to secure one or more components including at least one physical processor and one or more sensors, at least one camera mounted to the housing, and physical memory comprising computer-executable instructions that, when executed by the physical processor, cause the physical processor to: acquire one or more images of a surrounding environment using the camera mounted to the housing, identify one or more features of the surrounding environment from the acquired images, generate at least a portion of a map using the features identified from the acquired images, access sensor data generated by the one or more sensors, and determine a current pose of the system in the surrounding environment based on the features in the generated map and the accessed sensor data.

Such an apparatus may be manufactured or assembled in variety of ways. For instance, each component of the apparatus may be modular and may be manufactured separately and then mounted or assembled into a single apparatus. Alternatively, some or all of the components may be molded or embedded or formed within the housing. In some embodiments, a method of manufacturing such an apparatus may include assembling a housing dimensioned to secure one or more components including at least one physical processor and one or more sensors, mounting at least one camera to the housing, mounting the one or more sensors to the housing, and mounting physical memory and a physical processor to the housing, wherein the physical memory comprises computer-executable instructions that, when executed by the physical processor, cause the physical processor to: acquire one or more images of a surrounding environment using the camera mounted to the housing, identify one or more features of the surrounding environment from the acquired images, generate at least a portion of a map using the features identified from the acquired images, access sensor data generated by the one or more sensors, and determine a current pose of the system in the surrounding environment based on the features in the generated map and the accessed sensor data.

Accordingly, the embodiments described herein include a self-tracking peripheral device and methods for manufacturing the same. The self-tracking peripheral device may track itself in free space without any external cameras on other devices or in other parts of the environment. Moreover, the self-tracking peripheral device may determine its current location without needing line of sight to any other sensors or cameras. The self-tracking peripheral device may be lighter and less costly than traditional devices due to the implementation of fewer cameras. Moreover, the reduced number of cameras may reduce the occurrence of occlusions and may also increase battery life in the peripheral device.

As noted above, the self-tracking peripheral devices described herein may be used in conjunction with other artificial-reality systems. Embodiments of these artificial-reality systems are described in conjunction with FIGS. 9-14 below. The self-tracking peripheral devices described herein (e.g., 900 or 1000, respectively) may be used in conjunction with any of these devices, either alone or in combination.

Figure 9:
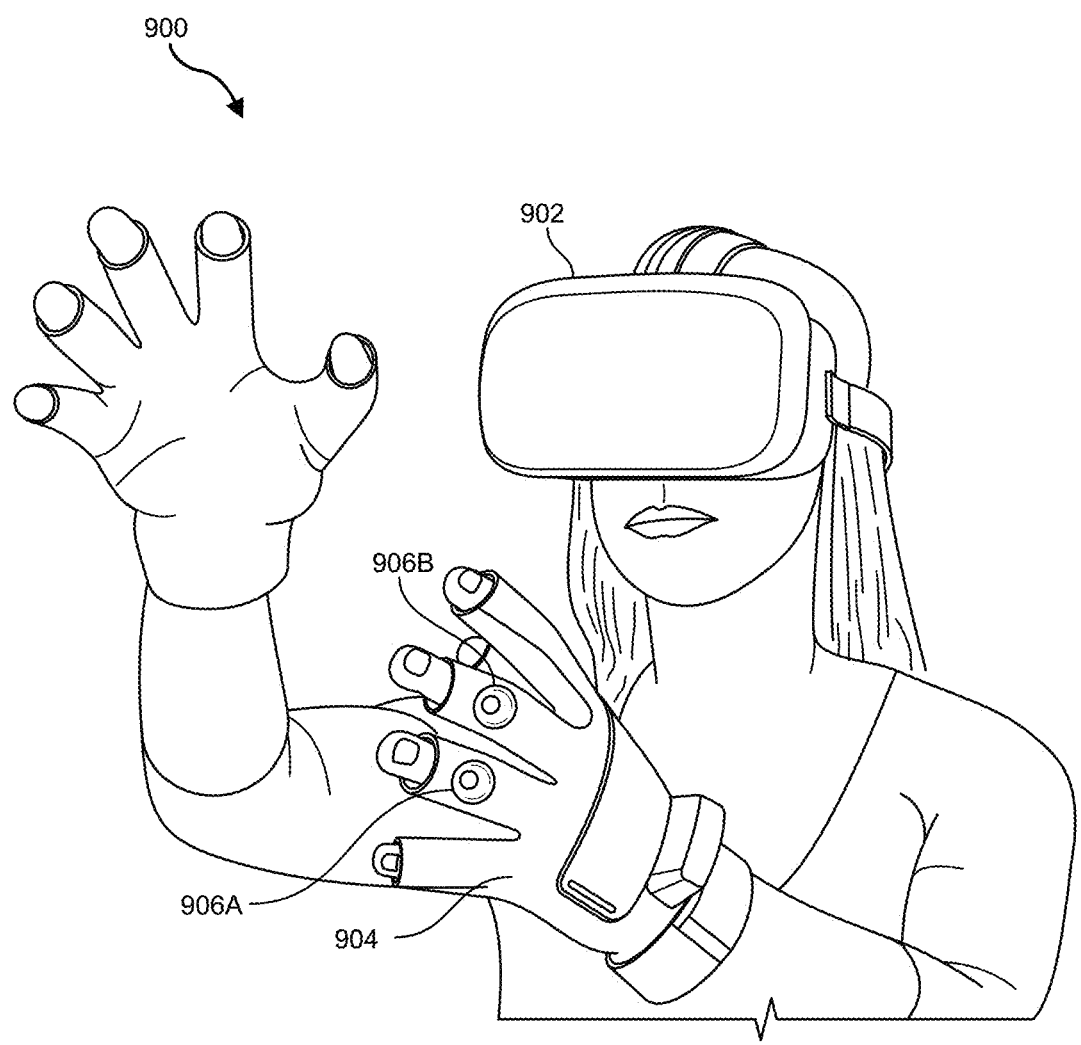
FIG. 9 is an illustration of an exemplary virtual-reality environment according to embodiments of this disclosure.

FIG. 9 shows an example artificial-reality environment 900 including an artificial-reality display 902 and two haptic devices 904 (e.g., gloves). In some embodiments, these gloves may include embedded cameras 906A and 906B.

These cameras may be used to capture images of the gloves' surroundings and use those captured images to determine the device's location in free space. In other embodiments, any number and/or combination of these components and other components may be included in an artificial-reality system. For example, in some embodiments there may be multiple artificial-reality devices each having an associated haptic device, with each artificial-reality device and each haptic device communicating with the same console, portable computing device, or other computing system.

Haptic device 904 generally represents any type or form of wearable device, worn by a user of an artificial-reality system, that provides haptic feedback to the user to give the user the perception that he or she is physically engaging with a virtual object. In some embodiments, haptic device 904 may provide haptic feedback by applying vibration, motion, and/or force to the user. For example, haptic device 904 may limit or augment a user's movement. To give a specific example, haptic device 904 may limit a user's hand from moving forward so that the user has the perception that his or her hand has come in physical contact with a virtual wall. In this specific example, one or more actuators within the haptic advice may achieve the physical-movement restriction by pumping fluid into an inflatable bladder of the haptic device. In some examples, a user may also use haptic device 904 to send action requests to a console. Examples of action requests include, without limitation, requests to start an application and/or end the application and/or requests to perform a particular action within the application.

Figure 10:
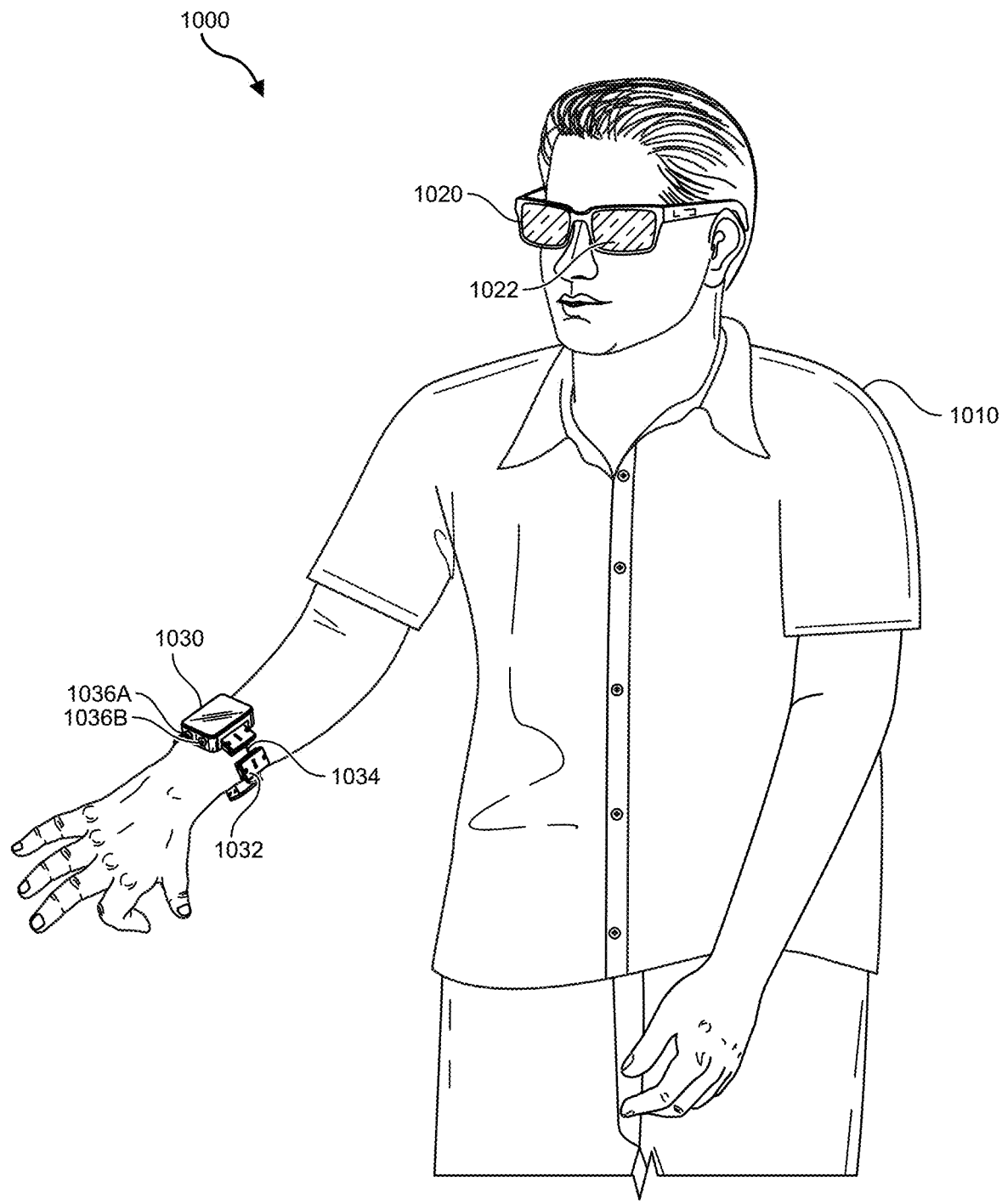
FIG. 10 is an illustration of an exemplary augmented-reality environment according to embodiments of this disclosure.

FIG. 10 is a perspective view of a user 1010 interacting with an artificial-reality system 1000. In this example, user 1010 may wear an artificial-reality device that may have one or more displays and that are paired with a haptic device 1030. In this example, haptic device 1030 may be a wristband that includes a plurality of band elements 1032 and a tensioning mechanism 1034 that connects band elements 1032 to one another.

One or more of band elements 1032 may include any type or form of actuator suitable for providing haptic feedback. For example, one or more of band elements 1032 may be configured to provide one or more of various types of cutaneous feedback, including vibration, force, traction, texture, and/or temperature. To provide such feedback, band elements 1032 may include one or more of various types of actuators. In one example, each of band elements 1032 may include a vibrotactor (e.g., a vibrotactile actuator) configured to vibrate in unison or independently to provide one or more of various types of haptic sensations to a user. Alternatively, only a single band element or a subset of band elements may include vibrotactors. The haptic device 1030 may also include one or more cameras (e.g., 1036A and 1036B). These cameras 1036A and 1036B may be used to capture images of the haptic device's surroundings in order to determine the device's location in free space.

Haptic devices 904, and 1030 may include any suitable number and/or type of haptic transducer, sensor, and/or feedback mechanism. For example, haptic devices 904, and 1030 may include one or more mechanical transducers, piezoelectric transducers, and/or fluidic transducers. The haptics devices may include linear resonant actuators (LRAs)) that operate at a fixed-frequency band and/or voice coil motors (VCMs) that operate at a wide frequency band including low frequencies, mid-range frequencies, and high frequency vibrations. Haptic devices 904, and 1030 may also include various combinations of different types and forms of transducers that work together or independently to enhance a user's artificial-reality experience including combinations of LRAs and VCMs. In one example, each of band elements 1032 of haptic device 1030 may include a vibrotactor (e.g., a vibrotactile actuator) configured to vibrate in unison or independently to provide one or more of various types of haptic sensations to a user.

Figure 11:
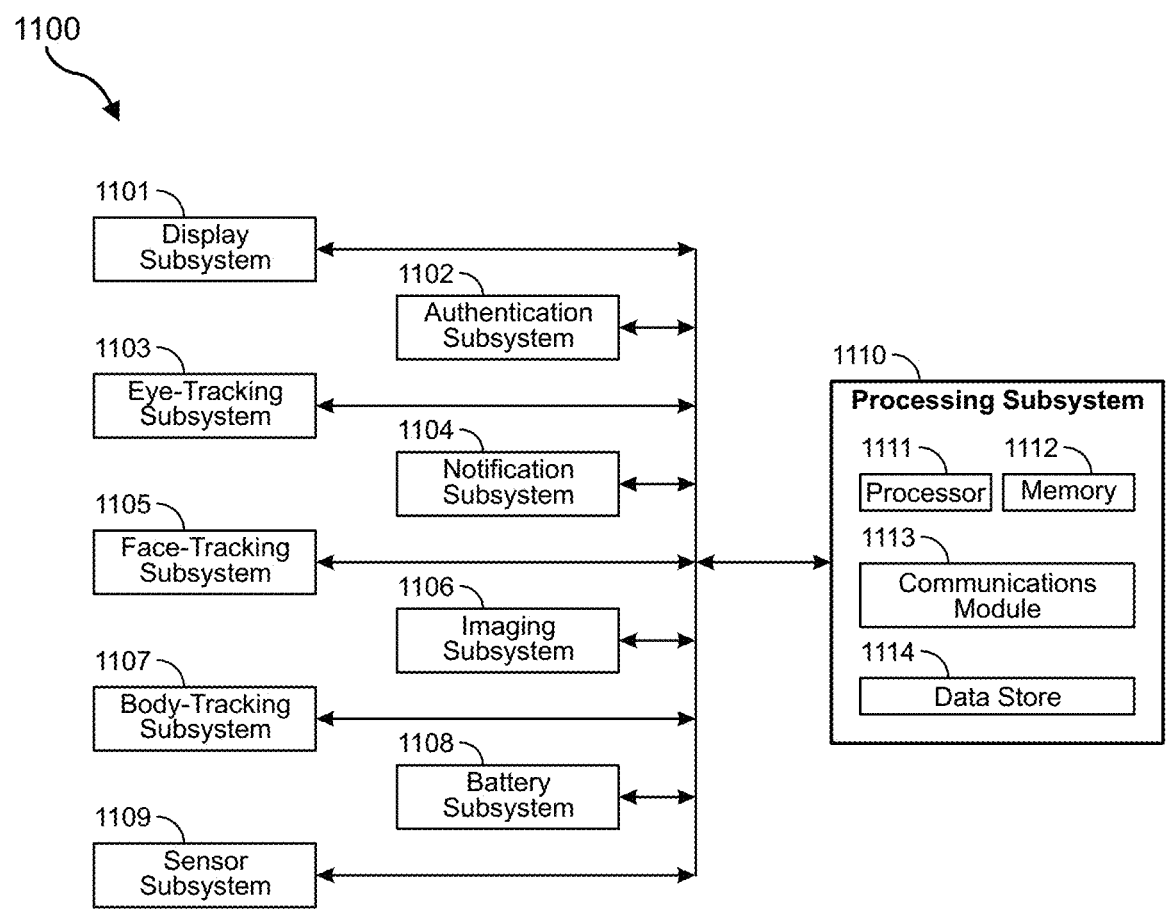
FIG. 11 is a block diagram illustrating an exemplary computing architecture for implementation in a self-tracking controller.

FIG. 11 illustrates a computing architecture 1100 with multiple different modules. Some or all of these modules may be incorporated in a self-tracking peripheral device or in the artificial-reality device to which the peripheral device is tethered. The computing architecture 1100 may include, for example, a display subsystem 1101, which may represent and/or include any of the various display components and/or attributes described herein. In this example, the display subsystem 1101 may interact with the processing subsystem 1110, including any of its various subcomponents. For instance, the display subsystem 1101 may interact with a processor 1111, memory 1112, a communications module 1113 (which may include or represent a variety of different wired or wireless connections, such as WiFi, Bluetooth, global positioning system (GPS) modules, cellular or other radios, etc.), and/or a data store 1114 (which may include or represent a variety of different volatile or non-volatile data storage devices).

In some cases, the processing subsystem 1110 may be embedded within on or coupled to an artificial-reality device. In other cases, the processing subsystem 1110 may be separate from and/or external to the artificial-reality device (as part of, e.g., a separate computing device, as described in greater detail below). In some examples, the processing subsystem 1110 may include one or more special-purpose, hardware-based accelerators, such as machine-learning accelerators designed to perform tasks associated with computer-vision processing.

In one example, the computing architecture 1100 may also include an authentication subsystem 1102. This authentication subsystem 1102 may be embedded within and/or coupled to an artificial-reality device. The authentication subsystem 1102 may include a variety of different hardware components, such as cameras, microphones, iris scanners, facial scanners, and/or other hardware components (such as the optical sensors and acoustic transducers incorporated into an artificial-reality device), each of which may be used to authenticate a user. In some cases, some or all of the functions of the artificial-reality device may be locked until the user is authenticated. For instance, and as will be explained in greater detail below, a user may use the authentication subsystem 1102 to authenticate him or herself and, in turn, transition the artificial-reality device from a "locked" state, in which some or all of the device's functionality is locked, to an "unlocked" state, in which some or all of the device's functionality is available to the user. In other cases, the authentication subsystem 1102 may authenticate the user to a network, for example, that provides data to the artificial-reality device.

In some examples, the authentication subsystem 1102 may authenticate the user based on the user's detected voice patterns, based on an iris scan of the user, based on a facial scan, based on a fingerprint scan, or based on some other form of biometric authentication. The authentication subsystem 1102 may be mounted on or embedded within the disclosed artificial-reality devices in a variety of ways. In some examples, the authentication subsystem 1102 may be part of an external device (described below) to which the artificial-reality device is connected.

In some embodiments, the computing architecture 1100 may also include an eye-tracking subsystem 1103 designed to identify and track various characteristics of a user's eye(s), such as their gaze direction. The eye-tracking subsystem 1103 may include a variety of different eye-tracking hardware components or other computer vision components. For example, the eye-tracking subsystem 1103 may include optical sensors, such as two-dimensional (2D) or 3D cameras, time-of-flight depth sensors, single-beam or sweeping laser rangefinders, 3D LiDAR sensors, and/or any other suitable type or form of optical sensor. In some examples, a processing subsystem (such as the processing subsystem 1110 in FIG. 11) may process data from one or more of these sensors to measure, detect, determine, and/or otherwise monitor the position, orientation, and/or motion of the user's eye(s).

In one example, the eye-tracking subsystem 1103 may be configured to identify and measure the inter-pupillary distance (IPD) of a user. In some embodiments, the eye-tracking subsystem 1103 may measure and/or calculate the IPD of the user while the user is wearing the artificial-reality device. In these embodiments, the eye-tracking subsystem 1103 may detect the positions of a user's eyes and may use this information to calculate the user's IPD.

The eye-tracking subsystem 1103 may track a user's eye position and/or eye movement in a variety of ways. In one example, one or more light sources and/or optical sensors may capture an image of the user's eyes. The eye-tracking subsystem 1103 may then use the captured information to determine the user's inter-pupillary distance, interocular distance, and/or a 3D position of each eye relative to the artificial-reality device (e.g., for distortion adjustment purposes), including a magnitude of torsion and rotation (i.e., roll, pitch, and yaw) and/or gaze directions for each eye. In one example, infrared light may be emitted by the eye-tracking subsystem 1103 and reflected from each eye. The reflected light may be received or detected by an optical sensor and analyzed to extract eye rotation data from changes in the infrared light reflected by each eye.

The eye-tracking subsystem 1103 may use any of a variety of different methods to track the eyes of an artificial-reality device user. For example, a light source (e.g., infrared light-emitting diodes) may emit a dot pattern onto each eye of the user. The eye-tracking subsystem 1103 may then detect (e.g., via an optical sensor coupled to the artificial-reality device) and analyze a reflection of the dot pattern from each eye of the user to identify a location of each pupil of the user. Accordingly, the eye-tracking subsystem 1103 may track up to six degrees of freedom of each eye (i.e., 3D position, roll, pitch, and yaw) and at least a subset of the tracked quantities may be combined from two eyes of a user to estimate a gaze point (i.e., a 3D location or position in a virtual scene where the user is looking) and/or an IPD.

In some cases, the distance between a user's pupil and a display may change as the user's eye moves to look in different directions. The varying distance between a pupil and a display as viewing direction changes may be referred to as "pupil swim" and may contribute to distortion perceived by the user as a result of light focusing in different locations as the distance between the pupil and the display changes. Accordingly, measuring distortion at different eye positions and pupil distances relative to displays and generating distortion corrections for different positions and distances may allow mitigation of distortion caused by "pupil swim" by tracking the 3D position of a user's eyes and applying a distortion correction corresponding to the 3D position of each of the user's eyes at a given point in time. Thus, knowing the 3D position of each of a user's eyes may allow for the mitigation of distortion caused by changes in the distance between the pupil of the eye and the display by applying a distortion correction for each 3D eye position. Furthermore, as noted above, knowing the position of each of the user's eyes may also enable the eye-tracking subsystem 1103 to make automated adjustments for a user's IPD.

In some embodiments, the display subsystem 1101 discussed above may include a variety of additional subsystems that may work in conjunction with the eye-tracking subsystem 1103. For example, the display subsystem 1101 may include a varifocal actuation subsystem, a scene-rendering module, and a vergence processing module. The varifocal subsystem may cause left and right display elements to vary the focal distance of the display device. In one embodiment, the varifocal subsystem may physically change the distance between a display and the optics through which it is viewed by moving the display, the optics, or both. Additionally, moving or translating two lenses relative to each other may also be used to change the focal distance of the display. Thus, the varifocal subsystem may include actuators or motors that move displays and/or optics to change the distance between them. This varifocal subsystem may be separate from or integrated into the display subsystem 1101. The varifocal subsystem may also be integrated into or separate from the actuation subsystem and/or the eye-tracking subsystem 1103.

In one example, the display subsystem 1101 may include a vergence processing module configured to determine a vergence depth of a user's gaze based on a gaze point and/or an estimated intersection of the gaze lines determined by the eye-tracking subsystem 1103. Vergence may refer to the simultaneous movement or rotation of both eyes in opposite directions to maintain single binocular vision, which may be naturally and automatically performed by the human eye. Thus, a location where a user's eyes are verged is where the user is looking and is also typically the location where the user's eyes are focused. For example, the vergence processing module may triangulate gaze lines to estimate a distance or depth from the user associated with intersection of the gaze lines. The depth associated with intersection of the gaze lines may then be used as an approximation for the accommodation distance, which may identify a distance from the user where the user's eyes are directed. Thus, the vergence distance may allow for the determination of a location where the user's eyes should be focused and a depth from the user's eyes at which the eyes are focused, thereby providing information (such as an object or plane of focus) for rendering adjustments to the virtual scene.

The vergence processing module may coordinate with the eye-tracking subsystem 1103 to make adjustments to the display subsystem 1101 to account for a user's vergence depth. When the user is focused on something at a distance, the user's pupils may be slightly farther apart than when the user is focused on something close. The eye-tracking subsystem 1103 may obtain information about the user's vergence or focus depth and may adjust the display subsystem 1101 to be closer together when the user's eyes focus or verge on something close and to be farther apart when the user's eyes focus or verge on something at a distance.

As detailed above, the display subsystem 1101 and the eye-tracking subsystem 1103 described herein may be configured in a number of different ways and may include a variety of elements and components.

In some embodiments, the systems described herein may also include an eye-tracking subsystem designed to identify and track various characteristics of a user's eye(s), such as the user's gaze direction. The phrase "eye tracking" may, in some examples, refer to a process by which the position, orientation, and/or motion of an eye is measured, detected, sensed, determined, and/or monitored. The disclosed systems may measure the position, orientation, and/or motion of an eye in a variety of different ways, including through the use of various optical-based eye-tracking techniques, ultrasound-based eye-tracking techniques, etc. An eye-tracking subsystem may be configured in a number of different ways and may include a variety of different eye-tracking hardware components or other computer-vision components. For example, an eye-tracking subsystem may include a variety of different optical sensors, such as two-dimensional (2D) or 3D cameras, time-of-flight depth sensors, single-beam or sweeping laser rangefinders, 3D LiDAR sensors, and/or any other suitable type or form of optical sensor. In this example, a processing subsystem may process data from one or more of these sensors to measure, detect, determine, and/or otherwise monitor the position, orientation, and/or motion of the user's eye(s).

Figure 12:
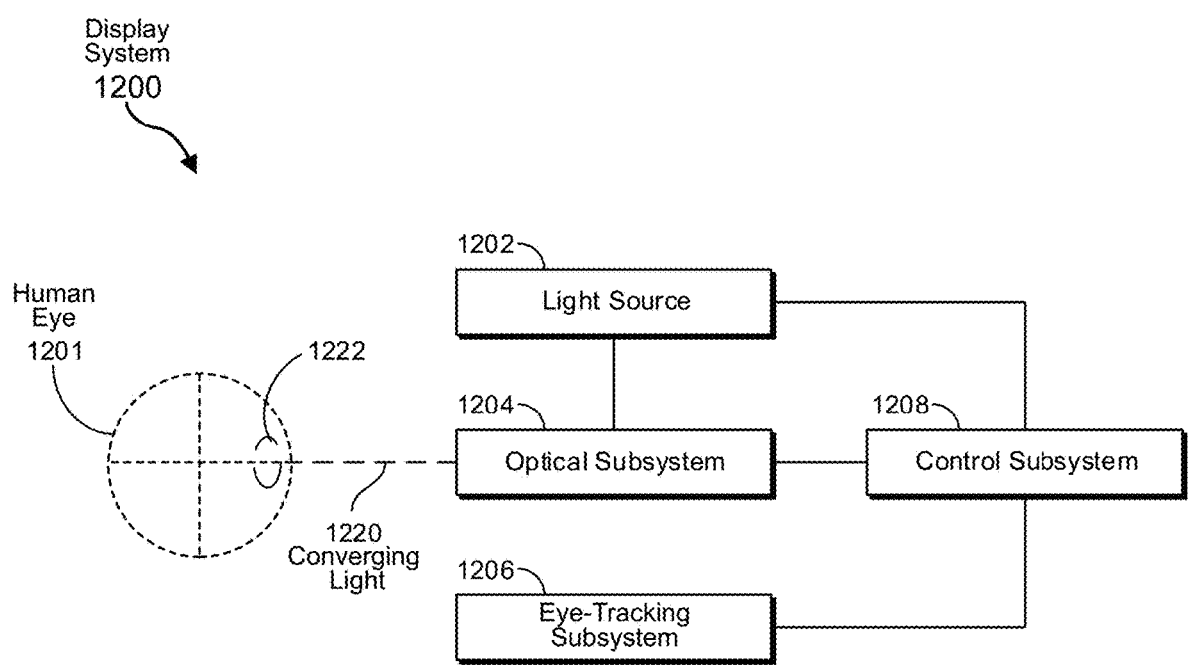
FIG. 12 an illustration of an exemplary system that incorporates an eye-tracking subsystem capable of tracking a user's eye(s).

FIG. 12 is an illustration of an exemplary system 1200 that incorporates an eye-tracking subsystem capable of tracking a user's eye(s). As depicted in FIG. 12, system 1200 may include a light source 1202, an optical subsystem 1204, an eye-tracking subsystem 1206, and/or a control subsystem 1208. In some examples, light source 1202 may generate light for an image (e.g., to be presented to an eye 1201 of the viewer). Light source 1202 may represent any of a variety of suitable devices. For example, light source 1202 can include a two-dimensional projector (e.g., a LCoS display), a scanning source (e.g., a scanning laser), or other device (e.g., an LCD, an LED display, an OLED display, an active-matrix OLED display (AMOLED), a transparent OLED display (TOLED), a waveguide, or some other display capable of generating light for presenting an image to the viewer). In some examples, the image may represent a virtual image, which may refer to an optical image formed from the apparent divergence of light rays from a point in space, as opposed to an image formed from the light ray's actual divergence.

In some embodiments, optical subsystem 1204 may receive the light generated by light source 1202 and generate, based on the received light, converging light 1220 that includes the image. In some examples, optical subsystem 1204 may include any number of lenses (e.g., Fresnel lenses, convex lenses, concave lenses), apertures, filters, mirrors, prisms, and/or other optical components, possibly in combination with actuators and/or other devices. In particular, the actuators and/or other devices may translate and/or rotate one or more of the optical components to alter one or more aspects of converging light 1220. Further, various mechanical couplings may serve to maintain the relative spacing and/or the orientation of the optical components in any suitable combination.

In one embodiment, eye-tracking subsystem 1206 may generate tracking information indicating a gaze angle of an eye 1201 of the viewer. In this embodiment, control subsystem 1208 may control aspects of optical subsystem 1204 (e.g., the angle of incidence of converging light 1220) based at least in part on this tracking information. Additionally, in some examples, control subsystem 1208 may store and utilize historical tracking information (e.g., a history of the tracking information over a given duration, such as the previous second or fraction thereof) to anticipate the gaze angle of eye 1201 (e.g., an angle between the visual axis and the anatomical axis of eye 1201). In some embodiments, eye-tracking subsystem 1206 may detect radiation emanating from some portion of eye 1201 (e.g., the cornea, the iris, the pupil, or the like) to determine the current gaze angle of eye 1201. In other examples, eye-tracking subsystem 1206 may employ a wavefront sensor to track the current location of the pupil.

Any number of techniques can be used to track eye 1201. Some techniques may involve illuminating eye 1201 with infrared light and measuring reflections with at least one optical sensor that is tuned to be sensitive to the infrared light. Information about how the infrared light is reflected from eye 1201 may be analyzed to determine the position(s), orientation(s), and/or motion(s) of one or more eye feature(s), such as the cornea, pupil, iris, and/or retinal blood vessels.

In some examples, the radiation captured by a sensor of eye-tracking subsystem 1206 may be digitized (i.e., converted to an electronic signal). Further, the sensor may transmit a digital representation of this electronic signal to one or more processors (for example, processors associated with a device including eye-tracking subsystem 1206). Eye-tracking subsystem 1206 may include any of a variety of sensors in a variety of different configurations. For example, eye-tracking subsystem 1206 may include an infrared detector that reacts to infrared radiation. The infrared detector may be a thermal detector, a photonic detector, and/or any other suitable type of detector. Thermal detectors may include detectors that react to thermal effects of the incident infrared radiation.

In some examples, one or more processors may process the digital representation generated by the sensor(s) of eye-tracking subsystem 1206 to track the movement of eye 1201. In another example, these processors may track the movements of eye 1201 by executing algorithms represented by computer-executable instructions stored on non-transitory memory. In some examples, on-chip logic (e.g., an application-specific integrated circuit or ASIC) may be used to perform at least portions of such algorithms. As noted, eye-tracking subsystem 1206 may be programmed to use an output of the sensor(s) to track movement of eye 1201. In some embodiments, eye-tracking subsystem 1206 may analyze the digital representation generated by the sensors to extract eye rotation information from changes in reflections. In one embodiment, eye-tracking subsystem 1206 may use corneal reflections or glints (also known as Purkinje images) and/or the center of the eye's pupil 1222 as features to track over time.

In some embodiments, eye-tracking subsystem 1206 may use the center of the eye's pupil 1222 and infrared or near-infrared, non-collimated light to create corneal reflections. In these embodiments, eye-tracking subsystem 1206 may use the vector between the center of the eye's pupil 1222 and the corneal reflections to compute the gaze direction of eye 1201. In some embodiments, the disclosed systems may perform a calibration procedure for an individual (using, e.g., supervised or unsupervised techniques) before tracking the user's eyes. For example, the calibration procedure may include directing users to look at one or more points displayed on a display while the eye-tracking system records the values that correspond to each gaze position associated with each point.

In some embodiments, eye-tracking subsystem 1206 may use two types of infrared and/or near-infrared (also known as active light) eye-tracking techniques: bright-pupil and dark-pupil eye tracking, which may be differentiated based on the location of an illumination source with respect to the optical elements used. If the illumination is coaxial with the optical path, then eye 1201 may act as a retroreflector as the light reflects off the retina, thereby creating a bright pupil effect similar to a red-eye effect in photography. If the illumination source is offset from the optical path, then the eye's pupil 1222 may appear dark because the retroreflection from the retina is directed away from the sensor. In some embodiments, bright-pupil tracking may create greater iris/pupil contrast, allowing more robust eye tracking with iris pigmentation, and may feature reduced interference (e.g., interference caused by eyelashes and other obscuring features). Bright-pupil tracking may also allow tracking in lighting conditions ranging from total darkness to a very bright environment.

In some embodiments, control subsystem 1208 may control light source 1202 and/or optical subsystem 1204 to reduce optical aberrations (e.g., chromatic aberrations and/or monochromatic aberrations) of the image that may be caused by or influenced by eye 1201. In some examples, as mentioned above, control subsystem 1208 may use the tracking information from eye-tracking subsystem 1206 to perform such control. For example, in controlling light source 1202, control subsystem 1208 may alter the light generated by light source 1202 (e.g., by way of image rendering) to modify (e.g., pre-distort) the image so that the aberration of the image caused by eye 1201 is reduced.

The disclosed systems may track both the position and relative size of the pupil (since, e.g., the pupil dilates and/or contracts). In some examples, the eye-tracking devices and components (e.g., sensors and/or sources) used for detecting and/or tracking the pupil may be different (or calibrated differently) for different types of eyes. For example, the frequency range of the sensors may be different (or separately calibrated) for eyes of different colors and/or different pupil types, sizes, and/or the like. As such, the various eye-tracking components (e.g., infrared sources and/or sensors) described herein may need to be calibrated for each individual user and/or eye.

The disclosed systems may track both eyes with and without ophthalmic correction, such as that provided by contact lenses worn by the user. In some embodiments, ophthalmic correction elements (e.g., adjustable lenses) may be directly incorporated into the artificial reality systems described herein. In some examples, the color of the user's eye may necessitate modification of a corresponding eye-tracking algorithm. For example, eye-tracking algorithms may need to be modified based at least in part on the differing color contrast between a brown eye and, for example, a blue eye.

Figure 13:
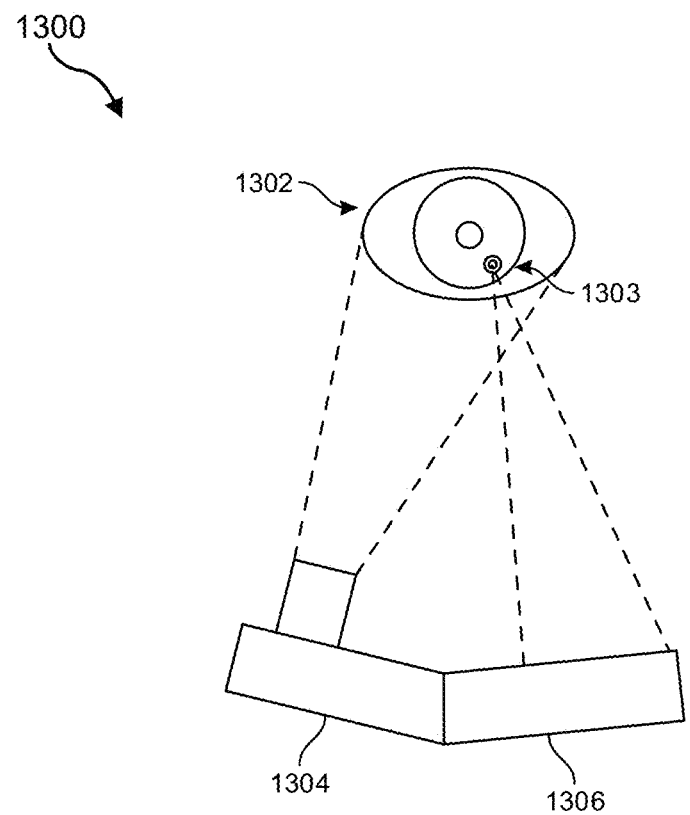
FIG. 13 is a more detailed illustration of various aspects of the eye-tracking subsystem illustrated in FIG. 12.
Figure 13:
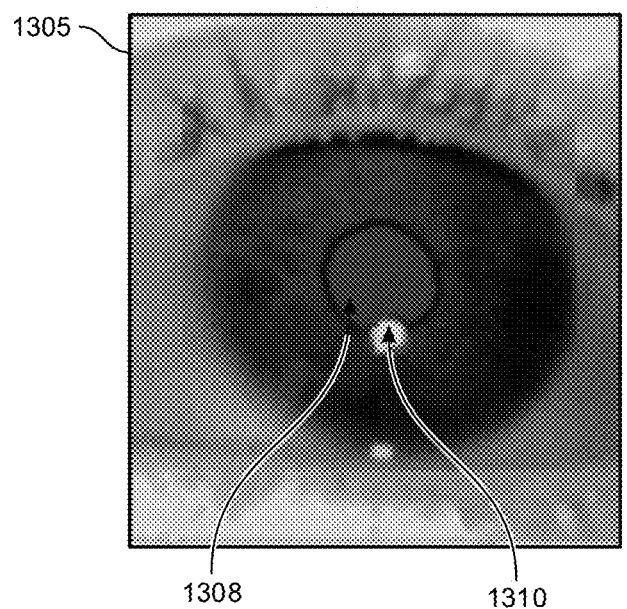

FIG. 13 is a more detailed illustration of various aspects of the eye-tracking subsystem illustrated in FIG. 12. As shown in this figure, an eye-tracking subsystem 1300 may include at least one source 1304 and at least one sensor 131206. Source 1304 generally represents any type or form of element capable of emitting radiation. In one example, source 1304 may generate visible, infrared, and/or near-infrared radiation. In some examples, source 1304 may radiate non-collimated infrared and/or near-infrared portions of the electromagnetic spectrum towards an eye 1302 of a user. Source 1304 may utilize a variety of sampling rates and speeds. For example, the disclosed systems may use sources with higher sampling rates in order to capture fixational eye movements of a user's eye 1302 and/or to correctly measure saccade dynamics of the user's eye 1302. As noted above, any type or form of eye-tracking technique may be used to track the user's eye 1302, including optical-based eye-tracking techniques, ultrasound-based eye-tracking techniques, etc.

Sensor 1306 generally represents any type or form of element capable of detecting radiation, such as radiation reflected off the user's eye 1302. Examples of sensor 1306 include, without limitation, a charge coupled device (CCD), a photodiode array, a complementary metal-oxide-semiconductor (CMOS) based sensor device, and/or the like. In one example, sensor 1306 may represent a sensor having predetermined parameters, including, but not limited to, a dynamic resolution range, linearity, and/or other characteristic selected and/or designed specifically for eye tracking.

As detailed above, eye-tracking subsystem 1300 may generate one or more glints. As detailed above, a glint 1303 may represent reflections of radiation (e.g., infrared radiation from an infrared source, such as source 1304) from the structure of the user's eye. In various embodiments, glint 1303 and/or the user's pupil may be tracked using an eye-tracking algorithm executed by a processor (either within or external to an artificial reality device). For example, an artificial reality device may include a processor and/or a memory device in order to perform eye tracking locally and/or a transceiver to send and receive the data necessary to perform eye tracking on an external device (e.g., a mobile phone, cloud server, or other computing device).

FIG. 13 shows an example image 1305 captured by an eye-tracking subsystem, such as eye-tracking subsystem 1300. In this example, image 1305 may include both the user's pupil 1308 and a glint 1310 near the same. In some examples, pupil 1308 and/or glint 1310 may be identified using an artificial-intelligence-based algorithm, such as a computer-vision-based algorithm. In one embodiment, image 1305 may represent a single frame in a series of frames that may be analyzed continuously in order to track the eye 1302 of the user. Further, pupil 1308 and/or glint 1310 may be tracked over a period of time to determine a user's gaze.

In one example, eye-tracking subsystem 1300 may be configured to identify and measure the inter-pupillary distance (IPD) of a user. In some embodiments, eye-tracking subsystem 1300 may measure and/or calculate the IPD of the user while the user is wearing the artificial reality system. In these embodiments, eye-tracking subsystem 1300 may detect the positions of a user's eyes and may use this information to calculate the user's IPD.

As noted, the eye-tracking systems or subsystems disclosed herein may track a user's eye position and/or eye movement in a variety of ways. In one example, one or more light sources and/or optical sensors may capture an image of the user's eyes. The eye-tracking subsystem may then use the captured information to determine the user's inter-pupillary distance, interocular distance, and/or a 3D position of each eye (e.g., for distortion adjustment purposes), including a magnitude of torsion and rotation (i.e., roll, pitch, and yaw) and/or gaze directions for each eye. In one example, infrared light may be emitted by the eye-tracking subsystem and reflected from each eye. The reflected light may be received or detected by an optical sensor and analyzed to extract eye rotation data from changes in the infrared light reflected by each eye.

The eye-tracking subsystem may use any of a variety of different methods to track the eyes of a user. For example, a light source (e.g., infrared light-emitting diodes) may emit a dot pattern onto each eye of the user. The eye-tracking subsystem may then detect (e.g., via an optical sensor coupled to the artificial reality system) and analyze a reflection of the dot pattern from each eye of the user to identify a location of each pupil of the user. Accordingly, the eye-tracking subsystem may track up to six degrees of freedom of each eye (i.e., 3D position, roll, pitch, and yaw) and at least a subset of the tracked quantities may be combined from two eyes of a user to estimate a gaze point (i.e., a 3D location or position in a virtual scene where the user is looking) and/or an IPD.

In some cases, the distance between a user's pupil and a display may change as the user's eye moves to look in different directions. The varying distance between a pupil and a display as viewing direction changes may be referred to as "pupil swim" and may contribute to distortion perceived by the user as a result of light focusing in different locations as the distance between the pupil and the display changes. Accordingly, measuring distortion at different eye positions and pupil distances relative to displays and generating distortion corrections for different positions and distances may allow mitigation of distortion caused by pupil swim by tracking the 3D position of a user's eyes and applying a distortion correction corresponding to the 3D position of each of the user's eyes at a given point in time. Thus, knowing the 3D position of each of a user's eyes may allow for the mitigation of distortion caused by changes in the distance between the pupil of the eye and the display by applying a distortion correction for each 3D eye position. Furthermore, as noted above, knowing the position of each of the user's eyes may also enable the eye-tracking subsystem to make automated adjustments for a user's IPD.

In some embodiments, a display subsystem may include a variety of additional subsystems that may work in conjunction with the eye-tracking subsystems described herein. For example, a display subsystem may include a varifocal subsystem, a scene-rendering module, and/or a vergence-processing module. The varifocal subsystem may cause left and right display elements to vary the focal distance of the display device. In one embodiment, the varifocal subsystem may physically change the distance between a display and the optics through which it is viewed by moving the display, the optics, or both. Additionally, moving or translating two lenses relative to each other may also be used to change the focal distance of the display. Thus, the varifocal subsystem may include actuators or motors that move displays and/or optics to change the distance between them. This varifocal subsystem may be separate from or integrated into the display subsystem. The varifocal subsystem may also be integrated into or separate from its actuation subsystem and/or the eye-tracking subsystems described herein.

In one example, the display subsystem may include a vergence-processing module configured to determine a vergence depth of a user's gaze based on a gaze point and/or an estimated intersection of the gaze lines determined by the eye-tracking subsystem. Vergence may refer to the simultaneous movement or rotation of both eyes in opposite directions to maintain single binocular vision, which may be naturally and automatically performed by the human eye. Thus, a location where a user's eyes are verged is where the user is looking and is also typically the location where the user's eyes are focused. For example, the vergence-processing module may triangulate gaze lines to estimate a distance or depth from the user associated with intersection of the gaze lines. The depth associated with intersection of the gaze lines may then be used as an approximation for the accommodation distance, which may identify a distance from the user where the user's eyes are directed. Thus, the vergence distance may allow for the determination of a location where the user's eyes should be focused and a depth from the user's eyes at which the eyes are focused, thereby providing information (such as an object or plane of focus) for rendering adjustments to the virtual scene.

The vergence-processing module may coordinate with the eye-tracking subsystems described herein to make adjustments to the display subsystem to account for a user's vergence depth. When the user is focused on something at a distance, the user's pupils may be slightly farther apart than when the user is focused on something close. The eye-tracking subsystem may obtain information about the user's vergence or focus depth and may adjust the display subsystem to be closer together when the user's eyes focus or verge on something close and to be farther apart when the user's eyes focus or verge on something at a distance.

The eye-tracking information generated by the above-described eye-tracking subsystems may also be used, for example, to modify various aspect of how different computer-generated images are presented. For example, a display subsystem may be configured to modify, based on information generated by an eye-tracking subsystem, at least one aspect of how the computer-generated images are presented. For instance, the computer-generated images may be modified based on the user's eye movement, such that if a user is looking up, the computer-generated images may be moved upward on the screen. Similarly, if the user is looking to the side or down, the computer-generated images may be moved to the side or downward on the screen. If the user's eyes are closed, the computer-generated images may be paused or removed from the display and resumed once the user's eyes are back open.

The above-described eye-tracking subsystems can be incorporated into one or more of the various artificial reality systems described herein in a variety of ways. For example, one or more of the various components of system 1200 and/or eye-tracking subsystem 1300 may be incorporated into artificial-reality environment 900 in FIG. 9 to enable these systems to perform various eye-tracking tasks (including one or more of the eye-tracking operations described herein).

The eye-tracking information generated by the above-described eye-tracking subsystem may be used, for example, to modify various aspect of how different computer-generated images are presented. In some embodiments, for example, a display subsystem (e.g., display subsystem 1101 in FIG. 11) may be configured to modify, based on information generated by the eye-tracking subsystem (e.g., eye-tracking subsystem 1103 in FIG. 11), at least one aspect of how the computer-generated images are presented. For instance, the computer-generated images may be modified based on the user's eye movement, such that if a user is looking up, the computer-generated images may be moved upward on the screen. Similarly, if the user is looking to the side or down, the computer-generated images may be moved to the side or downward on the screen. If the user's eyes are closed, the computer-generated images may be paused or removed from the display and resumed once the user's eyes are back open.

Returning to FIG. 11, in some embodiments the computing architecture 1100 may also include a face-tracking subsystem 1105 and/or a body-tracking subsystem 1107 configured to identify and track the movement of, and/or various characteristics of, a user's face and/or other body parts. In some examples, the face-tracking subsystem 1105 and/or the body-tracking subsystem 1107 may include one or more body- and/or face-tracking light sources and/or optical sensors, such as face/body-tracking component 1105/1107 in FIG. 11, along with potentially other sensors or hardware components. These components may be positioned or directed toward the user's face and/or body so as to capture movements of the user's mouth, cheeks, lips, chin, etc., as well as potentially movement of the user's body, including their arms, legs, hands, feet, torso, etc.

As noted, the face-tracking subsystem 1105 may be configured to identify and track facial expressions of a user. These facial expressions may be identified by tracking movements of individual parts of the user's face, as detailed above. The user's facial expressions may change over time and, as such, the face-tracking subsystem 1105 may be configured to operate on a continuous or continual basis to track the user's changing facial expressions. Classifications of these facial expressions may be stored in the data store 1114 of the processing subsystem 1110.

Similarly, the body-tracking subsystem 1107 may be configured to identify and track a position of substantially any part of the user's body. For example, the body-tracking subsystem 1107 may log initial positions for a user's arms, hands, legs, or feet and may note how those body parts move over time. In some cases, these body movements may be used as inputs to a processing subsystem of the artificial-reality device. For example, if a user wants to open or close the display in FIG. 11, the user may wave their hand or arm in a certain manner or perform a certain gesture (such as a snap or finger-closing motion). Or, if the user wants to interact with a virtual element presented on the display, the face/body-tracking component 1105/1107 (or other components of the body-tracking subsystem 1107) may track the user's body movements and use those movements as inputs to interact with an artificial reality generated by the artificial-reality device and/or to interact with software applications running on the processing subsystem 1110.

As with the eye-tracking subsystem 1103, the face-tracking subsystem 1105 and/or the body-tracking subsystem 1107 may be incorporated within and/or coupled to the artificial-reality devices disclosed herein in a variety of ways. In one example, all or a portion of the face-tracking subsystem 1105 and/or the body-tracking subsystem 1107 may be embedded within and/or attached to an outer portion of the artificial-reality device. For example, and as shown in FIG. 11, one or more face/body-tracking components 1105/1107 (which may represent, e.g., one or more light sources and/or optical sensors) may be embedded within and/or positioned near an outer portion of the artificial-reality device. By doing so, the face/body-tracking component(s) 1105/1107 may be positioned far enough away from the user's face and/or body to have a clear view of the user's facial expressions and/or facial and body movements.

Returning to FIG. 11, in some examples the computing architecture 1100 may also include an imaging subsystem 1106 configured to image a local environment of the artificial-reality device. This imaging subsystem 1106 may include or incorporate any of a variety of different imaging components and elements, such as light sources and optical sensors. For example, and as illustrated in FIG. 11, the imaging subsystem 1106 may include one or more world-facing cameras that are configured to capture images of the user's surroundings. These world-facing cameras may be mounted on or coupled to the artificial-reality device in a variety of different positions and patterns. In one example, the images captured by these world-facing cameras may be processed by the processing subsystem 1110. In some cases, the images may be stitched together to provide a 360-degree view of the user's local environment. In one embodiment, some or all of this surrounding view may be presented on the display of the artificial-reality device. As such, the user may be able to see either to the side or behind themselves simply by viewing the surrounding view presented on the display.

In some embodiments, the artificial-reality device may use the above-described world-facing cameras to map a user's and/or device's environment using techniques referred to as "simultaneous location and mapping" (SLAM). SLAM mapping and location identifying techniques may involve a variety of hardware and software tools that can create or update a map of an environment while simultaneously keeping track of a user's location within the mapped environment. SLAM may use many different types of sensors to create a map and determine a user's position within the map.

SLAM techniques used by an artificial-reality device may, for example, use data from optical sensors to determine a user's location. Radios including WiFi, Bluetooth, GPS, cellular, or other communication devices may be also used to determine a user's location relative to a radio transceiver or group of transceivers (e.g., a WiFi router or group of GPS satellites). Acoustic sensors such as microphone arrays or 2D or 3D sonar sensors may also be used to determine a user's location within an environment. The artificial-reality device may incorporate any or all of these types of sensors to perform SLAM operations such as creating and continually updating maps of the user's current environment. In at least some of the embodiments described herein, SLAM data generated by these sensors may be referred to as "environmental data" and may indicate a user's current environment. This data may be stored in a local or remote data store (e.g., a cloud data store) and may be provided to the artificial-reality device on demand.

Returning to FIG. 11, in some examples the computing architecture 1100 may include a sensor subsystem 1109 configured to detect, and generate sensor data that reflects, changes in a local environment of the artificial-reality device. The sensor subsystem 1109 may include a variety of different sensors and sensing elements, examples of which include, without limitation, a position sensor, an inertial measurement unit (IMU), a depth camera assembly, an audio sensor, a video sensor, a location sensor (e.g., GPS), a light sensor, and/or any sensor or hardware component from any another subsystem described herein. In embodiments in which the sensors include an IMU, the IMU may generate calibration data based on measurement signals from the sensor(s). Examples of IMUs may include, without limitation, accelerometers, gyroscopes, magnetometers, other suitable types of sensors that detect motion, sensors used for error correction of the IMU, or some combination thereof.

The above-described sensor data may include a change in location (e.g., from a GPS location sensor), a change in audible surroundings (e.g., from an audio sensor), a change in visual surroundings (e.g., from a camera or other light sensor), a change in inertia (e.g., from an IMU), or other changes that may indicate that the user's environment has changed. A change in the amount of ambient light, for example, may be detected by a light sensor. In response to the detected increase in ambient light, the display subsystem 1101 (in conjunction with the processing subsystem 1110) may increase the brightness of the display (e.g., the display in FIG. 11). An increase in ambient sound (e.g., as detected by an input audio transducer) may result in an increase in sound amplitude (e.g., in an output audio transducer). Other environmental changes may also be detected and implemented as feedback within the artificial-reality device's computing environment. In some cases, the sensor subsystem 1109 may generate measurement signals in response to motion of the artificial-reality device.

When a user is using the artificial-reality device in a given environment, the user may be interacting with other users or other electronic devices that serve as audio sources. In some cases, it may be desirable to determine where the audio sources are located relative to the user and then present audio from the audio sources to the user as if they were coming from the location of the audio source. The process of determining where the audio sources are located relative to the user may be referred to as "localization," and the process of rendering playback of the audio source signal to appear as if it is coming from a specific direction may be referred to as "spatialization."

Localizing an audio source may be performed in a variety of different ways. In some cases, a subsystem of the artificial-reality device (such as the processing subsystem 1110 in FIG. 11) may initiate a direction-of-arrival (DOA) analysis to determine the location of a sound source. The DOA analysis may include analyzing the intensity, spectra, and/or arrival time of each sound at the artificial-reality device to determine the direction from which the sounds originated. The DOA analysis may include any suitable algorithm for analyzing the surrounding acoustic environment in which the artificial-reality device is located.

For example, the DOA analysis may be designed to receive input signals from a microphone and apply digital signal processing algorithms to the input signals to estimate the direction of arrival. These algorithms may include, for example, delay and sum algorithms where the input signal is sampled and the resulting weighted and delayed versions of the sampled signal are averaged together to determine a direction of arrival. A least mean squared (LMS) algorithm may also be implemented to create an adaptive filter. This adaptive filter may then be used to identify differences in signal intensity, for example, or differences in time of arrival. These differences may then be used to estimate the direction of arrival. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct-path audio signal. Those bins having a portion of the direct-path signal may then be analyzed to identify the angle at which a microphone array received the direct-path audio signal. The determined angle may then be used to identify the direction of arrival for the received input signal. Other algorithms not listed above may also be used alone or in combination with the above algorithms to determine DOA.

In some embodiments, different users may perceive the source of a sound as coming from slightly different locations. This may be the result of each user having a unique head-related transfer function (HRTF), which may be dictated by a user's anatomy including ear canal length and the positioning of the ear drum. In these embodiments, the artificial-reality device may provide an alignment and orientation guide, which the user may follow to customize the sound signal presented to the user based on their unique HRTF. In some embodiments, the artificial-reality device may use a variety of different array transfer functions (e.g., any of the DOA algorithms identified above) to estimate the direction of arrival for the sounds. Once the direction of arrival has been determined, the artificial-reality device may play back sounds to the user according to the user's unique HRTF. Accordingly, the DOA estimation generated using the array transfer function (ATF) may be used to determine the direction from which the sounds are to be played from. The playback sounds may be further refined based on how that specific user hears sounds according to the HRTF.

In addition to or as an alternative to performing a DOA estimation, the artificial-reality device may perform localization based on information received from other types of sensors, such as the sensor subsystem 1109 in FIG. 11. These sensors may include cameras, IR sensors, heat sensors, motion sensors, GPS receivers, or in some cases, sensors that detect a user's eye movements. For example, as noted above, artificial-reality device may include an eye-tracking subsystem 1103 that determines where the user is looking. Often, the user's eyes will look at the source of the sound, if only briefly. Such clues provided by the user's eyes may further aid in determining the location of a sound source. Other sensors such as cameras, heat sensors, and IR sensors may also indicate the location of a user, the location of an electronic device, or the location of another sound source. Any or all of the above methods may be used individually or in combination to determine the location of a sound source and may further be used to update the location of a sound source over time.

Some embodiments may implement the determined DOA to generate a more customized output audio signal for the user. For instance, an "acoustic transfer function" may characterize or define how a sound is received from a given location. More specifically, an acoustic transfer function may define the relationship between parameters of a sound at its source location and the parameters by which the sound signal is detected (e.g., detected by a microphone array or detected by a user's ear). The artificial-reality device may include one or more acoustic sensors that detect sounds within range of the device. A processing subsystem of the artificial-reality device (such as the processing subsystem 1110) may estimate a DOA for the detected sounds (using, e.g., any of the methods identified above) and, based on the parameters of the detected sounds, may generate an acoustic transfer function that is specific to the location of the device. This customized acoustic transfer function may thus be used to generate a spatialized output audio signal where the sound is perceived as coming from a specific location.

Once the location of the sound source or sources is known, the artificial-reality device may re-render (i.e., spatialize) the sound signals to sound as if coming from the direction of that sound source. The artificial-reality device may apply filters or other digital signal processing that alter the intensity, spectra, or arrival time of the sound signal. The digital signal processing may be applied in such a way that the sound signal is perceived as originating from the determined location. The artificial-reality device may amplify or subdue certain frequencies or change the time that the signal arrives at each ear. In some cases, the artificial-reality device may create an acoustic transfer function that is specific to the location of the device and the detected direction of arrival of the sound signal. In some embodiments, the artificial-reality device may re-render the source signal in a stereo device or multi-speaker device (e.g., a surround sound device). In such cases, separate and distinct audio signals may be sent to each speaker. Each of these audio signals may be altered according to the user's HRTF and according to measurements of the user's location and the location of the sound source to sound as if they are coming from the determined location of the sound source. Accordingly, in this manner, the artificial-reality device (or speakers associated with the device) may re-render an audio signal to sound as if originating from a specific location.

Returning to FIG. 11, in some examples the computing architecture 1100 may also include a battery subsystem 1108 configured to provide electrical power for the artificial-reality device. The battery subsystem 1108 may include a variety of different components and elements, examples of which include, without limitation, lithium ion batteries, lithium-polymer batteries, primary lithium batteries, alkaline batteries, or any other form of power source or power storage device. The battery subsystem 1108 may be incorporated into and/or otherwise associated with the artificial-reality devices disclosed herein in a variety of ways. In some examples, all or a portion of the battery subsystem 1108 may be embedded or disposed within a back portion or area of the artificial-reality device.

In some examples, the artificial-reality device may include or be connected to an external device (e.g., a paired device), such as a neckband, charging case, smart watch, smartphone, wrist band, other wearable device, hand-held controller, tablet computer, laptop computer, and/or other external compute device, etc. This external device generally represents any type or form of paired device (such as system 1270 in FIG. 12, described in greater detail below).

The external device may be coupled to the artificial-reality device via one or more connectors. The connectors may be wired or wireless and may include electrical and/or non-electrical (e.g., structural) components. In some cases, the artificial-reality device and the external device may operate independently without any wired or wireless connection between them.

Pairing external devices with the artificial-reality device may enable the artificial-reality device to achieve certain form factors while still providing sufficient battery and computation power for expanded capabilities. Some or all of the battery power, computational resources, and/or additional features of the artificial-reality device may be provided by a paired device or shared between a paired device and the artificial-reality device, thus reducing the weight, heat profile, and form factor of the artificial-reality device overall while still retaining the desired functionality. For example, the external device may allow components that would otherwise be included on a device to be included in the external device since users may tolerate a heavier weight load in their pockets, shoulders, or hands than they would tolerate on their heads. The external device may also have a larger surface area over which to diffuse and disperse heat to the ambient environment.

Thus, an external device may allow for greater battery and computation capacity than might otherwise have been possible on a stand-alone headwear device. Since weight carried in the external device may be less invasive to a user than weight carried in the artificial-reality device, a user may tolerate wearing a lighter artificial-reality device and carrying or wearing the paired device for greater lengths of time than a user would tolerate wearing a heavy standalone artificial-reality device, thereby enabling users to more fully incorporate artificial-reality environments into their day-to-day activities.

The external device may be communicatively coupled with the artificial-reality device and/or to other devices. These other devices may provide certain functions (e.g., tracking, localizing, depth mapping, processing, storage, etc.) to the artificial-reality device. For example, the external device may include multiple acoustic transducers, such as the acoustic transducers 1207 and 1208 described above.

A processing subsystem on the external device may process information generated by the sensors on the external device and/or the artificial-reality device. For example, the processing subsystem may process information from a microphone array (such as input audio transducers) that describes sounds detected by the microphone array. For each detected sound, the processing subsystem may perform a DOA estimation to estimate a direction from which the detected sound arrived at the microphone array. As the microphone array detects sounds, the processing subsystem may populate an audio data set with the information. In embodiments in which the artificial-reality device includes an inertial measurement unit, the processing subsystem may compute all inertial and spatial calculations from the IMU located on the artificial-reality device. A connector may convey information between the artificial-reality device and the external device and between the artificial-reality device and the processing subsystem. The information may be in the form of optical data, electrical data, wireless data, or any other transmittable form. As noted, moving the processing of information generated by the artificial-reality device to the external device may reduce weight and heat in the artificial-reality device, making it more comfortable to the user.

Returning to FIG. 11, in some examples the computing architecture 1100 may also include a notification subsystem 1104. This notification subsystem 1104 may be configured to generate user notifications that are communicated to the user. The user notifications may include audio-based notifications, haptics-based notifications, visual-based notifications, or other types of notifications. For example, the notification subsystem 1104 may generate an audio notification (via, e.g., the acoustic transducers described in connection with FIG. 11) when a text message or email is received (by, e.g., the artificial-reality device and/or an external device). In other cases, various haptic transducers (as described further below in connection with FIG. 14) may buzz or vibrate to instruct a user to move the display screen (e.g., the display of FIG. 11) down from its storage position to a viewing position.

In another example, an IR camera may detect another artificial-reality device within the same room and/or an audio sensor may detect an inaudible frequency emitted by the other artificial-reality device. In this example, the artificial-reality device may display a message on the display instructing the user to switch to artificial reality mode so that the artificial-reality device and the detected device may interact. Many other types of notifications are also possible. In some cases, the artificial-reality device may respond automatically to the notification, while in other cases, the user may perform some type of interaction to respond to the notification.

In some examples, the notification subsystem 1104 may include one or more haptic components disposed in various locations on the artificial-reality device. These haptic transducers may be configured to generate haptic outputs, such as buzzes or vibrations. The haptic transducers may be positioned within the artificial-reality device in a variety of ways. Users may be able to detect haptic sensations from substantially any location on the artificial-reality device and, as such, the haptic transducers may be disposed throughout the device.

In some cases, the haptic transducers may be disposed on or within the artificial-reality device in patterns. For instance, the haptic transducers may be arranged in rows or circles or lines throughout the artificial-reality device. These haptic transducers may be actuated at different times to generate different patterns that may be felt by the user. In some examples, the haptic transducers may be actuated in a certain manner to correspond to a particular notification. For instance, a short buzz on the right side of the artificial-reality device may indicate that the user has received a text message. A pattern of two short vibrations on the left side of the artificial-reality device may indicate that the user is receiving a phone call or may also indicate who that phone call is from. A string of vibrations from successive haptic transducers 1405 arranged in a row may indicate that an interesting artificial reality feature is available in the user's current location and that the user should consider lowering the display. In addition, a pattern of vibrations that moves from right to left may indicate that the user should take a left turn at an intersection. Many other such notifications are possible, and the above-identified list is not intended to be limiting.

The haptic transducers or other haptic feedback elements may provide various types of cutaneous feedback, including vibration, force, traction, texture, and/or temperature. Haptic transducers may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, the artificial-reality device may create an entire artificial experience or enhance a user's real-world experience in a variety of contexts and environments. For instance, the artificial-reality device may assist or extend a user's perception, memory, or cognition within a particular environment. The artificial-reality device may also enhance a user's interactions with other people in the real world or may enable more immersive interactions with other people in a virtual world. The artificial-reality device may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial-reality experience in one or more of these contexts and environments and/or in other contexts and environments.

As noted, artificial-reality systems 9000 and 1000 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 14:
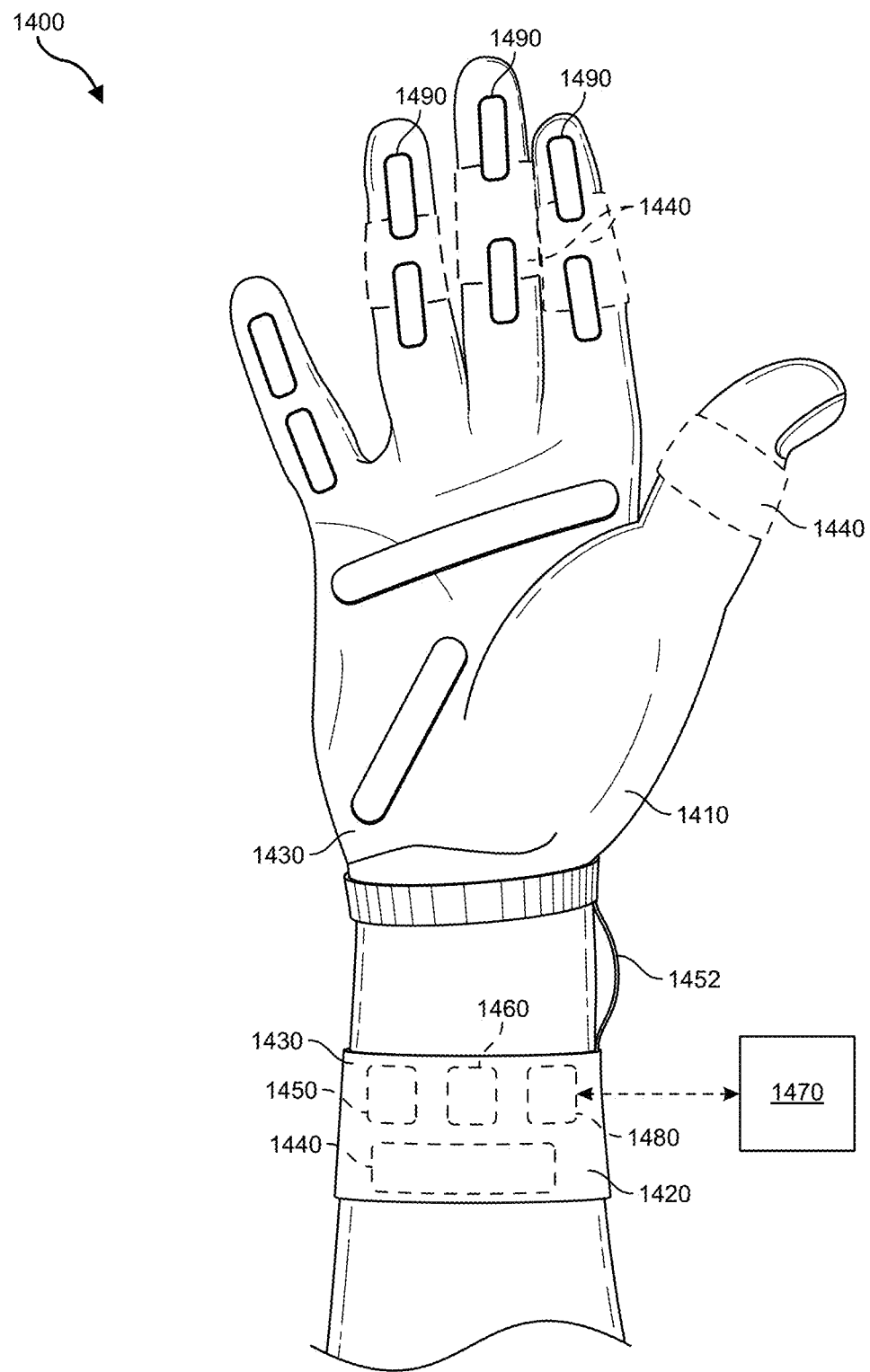
FIG. 14 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 14 illustrates a vibrotactile system 1400 in the form of a wearable glove (haptic device 1410) and wristband (haptic device 1420). Haptic device 1410 and haptic device 1420 are shown as examples of wearable devices that include a flexible, wearable textile material 1430 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities.

In some examples, the term "textile" may include any flexible, wearable material, including woven fabric, non-woven fabric, leather, cloth, a flexible polymer material, composite materials, etc.

One or more vibrotactile devices 1440 may be positioned at least partially within one or more corresponding pockets formed in textile material 1430 of vibrotactile system 1400. Vibrotactile devices 1440 may be positioned in locations to provide a vibrating sensation (e.g., haptic feedback) to a user of vibrotactile system 1400. For example, vibrotactile devices 1440 may be positioned against the user's finger(s), thumb, or wrist, as shown in FIG. 14. Vibrotactile devices 1440 may, in some examples, be sufficiently flexible to conform to or bend with the user's corresponding body part(s).

A power source 1450 (e.g., a battery) for applying a voltage to the vibrotactile devices 1440 for activation thereof may be electrically coupled to vibrotactile devices 1440, such as via conductive wiring 1452. In some examples, each of vibrotactile devices 1440 may be independently electrically coupled to power source 1450 for individual activation. In some embodiments, a processor 1460 may be operatively coupled to power source 1450 and configured (e.g., programmed) to control activation of vibrotactile devices 1440.

Vibrotactile system 1400 may be implemented in a variety of ways. In some examples, vibrotactile system 1400 may be a standalone system with integral subsystems and components for operation independent of other devices and systems. As another example, vibrotactile system 1400 may be configured for interaction with another device or system 1470. For example, vibrotactile system 1400 may, in some examples, include a communications interface 1480 for receiving and/or sending signals to the other device or system 1470. The other device or system 1470 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. Communications interface 1480 may enable communications between vibrotactile system 1400 and the other device or system 1470 via a wireless (e.g., Wi-Fi, Bluetooth, cellular, radio, etc.) link or a wired link. If present, communications interface 1480 may be in communication with processor 1460, such as to provide a signal to processor 1460 to activate or deactivate one or more of the vibrotactile devices 1440.

Vibrotactile system 1400 may optionally include other subsystems and components, such as touch-sensitive pads 1490, pressure sensors, motion sensors, position sensors, lighting elements, and/or user interface elements (e.g., an on/off button, a vibration control element, etc.). During use, vibrotactile devices 1440 may be configured to be activated for a variety of different reasons, such as in response to the user's interaction with user interface elements, a signal from the motion or position sensors, a signal from the touch-sensitive pads 1490, a signal from the pressure sensors, a signal from the other device or system 1470, etc.

Although power source 1450, processor 1460, and communications interface 1480 are illustrated in FIG. 14 as being positioned in haptic device 1420, the present disclosure is not so limited. For example, one or more of power source 1450, processor 1460, or communications interface 1480 may be positioned within haptic device 1410 or within another wearable textile.

Haptic wearables, such as those shown in and described in connection with FIG. 14, may be implemented in a variety of types of artificial-reality systems and environments. FIG. 9 shows an example artificial-reality environment 900 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Head-mounted display 902 generally represents any type or form of virtual-reality system, such as a virtual-reality system. Haptic device 904 generally represents any type or form of wearable device, worn by a user of an artificial-reality system, that provides haptic feedback to the user to give the user the perception that he or she is physically engaging with a virtual object. In some embodiments, haptic device 904 may provide haptic feedback by applying vibration, motion, and/or force to the user. For example, haptic device 904 may limit or augment a user's movement. To give a specific example, haptic device 904 may limit a user's hand from moving forward so that the user has the perception that his or her hand has come in physical contact with a virtual wall. In this specific example, one or more actuators within the haptic device may achieve the physical-movement restriction by pumping fluid into an inflatable bladder of the haptic device. In some examples, a user may also use haptic device 904 to send action requests to a console. Examples of action requests include, without limitation, requests to start an application and/or end the application and/or requests to perform a particular action within the application.

While haptic interfaces may be used with virtual-reality systems, as shown in FIG. 9, haptic interfaces may also be used with augmented-reality systems, as shown in FIG. 10. FIG. 10 is a perspective view of a user 1010 interacting with an artificial-reality system 1000. In this example, user 1010 may wear a pair of augmented-reality glasses 1020 that may have one or more displays 1022 and that are paired with a haptic device 1030. In this example, haptic device 1030 may be a wristband that includes a plurality of band elements 1032 and a tensioning mechanism 1034 that connects band elements 1032 to one another.

One or more of band elements 1032 may include any type or form of actuator suitable for providing haptic feedback. For example, one or more of band elements 1032 may be configured to provide one or more of various types of cutaneous feedback, including vibration, force, traction, texture, and/or temperature. To provide such feedback, band elements 1032 may include one or more of various types of actuators. In one example, each of band elements 1032 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 1410, 1420, 904, and 1030 may include any suitable number and/or type of haptic transducer, sensor, and/or feedback mechanism. For example, haptic devices 1410, 1420, 904, and 1030 may include one or more mechanical transducers, piezoelectric transducers, and/or fluidic transducers. Haptic devices 1410, 1420, 904, and 1030 may also include various combinations of different types and forms of transducers that work together or independently to enhance a user's artificial-reality experience. In one example, each of band elements 1032 of haptic device 1030 may include a vibrotactor (e.g., a vibrotactile actuator) configured to vibrate in unison or independently to provide one or more of various types of haptic sensations to a user.

EXAMPLE EMBODIMENTS

Example 1: A system comprising: a housing dimensioned to secure one or more components including at least one physical processor, one or more sensors, and at least one camera, and physical memory comprising computer-executable instructions that, when executed by the physical processor, cause the physical processor to: acquire one or more images of a surrounding environment using the camera mounted to the housing, identify one or more features of the surrounding environment from the acquired images, generate at least a portion of a map using the features identified from the acquired images, access sensor data generated by the one or more sensors, and determine a current pose of the system in the surrounding environment based on the features in the generated map and the accessed sensor data.

Example 2: The system of Example 1, wherein the physical processor further implements one or more computer vision algorithms to identify the features in the acquired images.

Example 3: The system of Examples 1 or 2, wherein the physical processor triangulates the system to one or more of the identified features in the acquired images.

Example 4: The system of Examples 1-3, wherein determining the current pose of the system in the surrounding environment based on the features in the generated map and the accessed sensor data is performed without line of sight between the system and the HMD of the artificial-reality system.

Example 5: The system of Examples 1-4, wherein the system includes at least two cameras and wherein the physical processor implements images captured by the at least two cameras as part of a two-camera baseline to identify a three-dimensional (3D) position of a specified feature of the environment.

Example 6: The system of Examples 1-5, wherein the physical processor is configured to continually identify new features of the environment from the acquired images and add those new features to the generated map.

Example 7: The system of Examples 1-6, wherein the physical processor determines the current pose of the system in the surrounding environment based on the newly identified features in the generated map.

Example 8: The system of Examples 1-7, further comprising a head-mounted display (HMD) of an artificial-reality system.

Example 9: The system of Examples 1-8, wherein the physical processor is configured to: determine whether one or more conditions exist that would cause the system to consult portions of an alternative map of the surrounding environment; and upon determining that at least one of the one or more conditions exist, accessing at least a portion of the alternative map of the surrounding environment.

Example 10: The system of Examples 1-9, wherein the alternative map of the surrounding environment is generated by the artificial-reality system.

Example 11: The system of Examples 1-10, wherein the physical processor is configured to: determine whether one or more conditions exist that would cause the system to combine portions of an alternative map of the surrounding environment with the generated map; and upon determining that at least one of the one or more conditions exist, combining one or more portions of the alternative map with the generated map.

Example 12: The system of Examples 1-11, wherein the physical processor determines the current pose of the system in the surrounding environment based on the features in the combined map and the accessed sensor data.

Example 13: An electronic device comprising: a housing dimensioned to secure one or more components including at least one physical processor and one or more sensors, at least one camera mounted to the housing, and physical memory comprising computer-executable instructions that, when executed by the physical processor, cause the physical processor to: acquire one or more images of a surrounding environment using the camera mounted to the housing, identify one or more features of the surrounding environment from the acquired images, generate at least a portion of a map using the features identified from the acquired images, access sensor data generated by the one or more sensors, and determine a current pose of the apparatus in the surrounding environment based on the features in the generated map and the accessed sensor data.

Example 14: The electronic device of Example 13, wherein the apparatus comprises a handheld electronic device controller.

Example 15: The electronic device of Examples 13 or 14, wherein the physical processor distributes at least a portion of computing tasks related to identifying the one or more features of the surrounding environment from the acquired images to one or more external computer systems.

Example 16: The electronic device of Examples 13-15, further comprising a communications module including a wireless transceiver, and wherein the physical processor implements the communications module to communicate with a peripheral device.

Example 17: The electronic device of Examples 13-16, wherein the apparatus and the peripheral device exchange image data, and wherein the physical processor updates the generated map using image data received from the peripheral device.

Example 18: The electronic device of Examples 13-17, wherein the image data received from the peripheral device is used by the physical processor to determine an updated pose of the apparatus upon the apparatus losing its position within the surrounding environment.

Example 19: The electronic device of Examples 13-18, wherein the physical processor is further configured to identify at least one of the features of the surrounding environment as being private and obfuscating those features within the generated map.

Example 20: A non-transitory computer-readable medium comprising one or more computer-executable instructions that, when executed by at least one processor of a computing device, cause the computing device to: acquire one or more images of a surrounding environment using the camera mounted to the housing, identify one or more features of the surrounding environment from the acquired images, generate at least a portion of a map using the features identified from the acquired images, access sensor data generated by the one or more sensors, and determine a current pose of the housing in the surrounding environment based on the features in the generated map and the accessed sensor data.

As detailed above, the computing devices and systems described and/or illustrated herein broadly represent any type or form of computing device or system capable of executing computer-readable instructions, such as those contained within the systems and modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), FPGAs that implement softcore processors, ASICs, portions of one or more of the same, variations or combinations of one or more of the same, or any other suitable physical processor.

Although illustrated as separate elements, the system and modules described and/or illustrated herein may represent portions of a single system, module, or application. In addition, in certain embodiments one or more of these systems or modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the systems or modules described herein may transform data, physical devices, and/or representations of physical devices from one form to another. For example, one or more of the modules or subsystems recited herein may receive data to be transformed, transform the data, output a result of the transformation to perform a function that corresponds to the modules or subsystem, use the result of the transformation to perform the specified function, and store the result of the transformation in a data store. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system comprising:
a housing dimensioned to secure one or more components including at least one physical processor, one or more sensors, and a plurality of cameras; and
physical memory comprising computer-executable instructions that, when executed by the at least one physical processor, cause the at least one physical processor to:
acquire a plurality of images of a surrounding environment using the plurality of cameras mounted to the housing;
identify one or more features of the surrounding environment from the acquired plurality of images;
generate a map using the one or more features identified from the acquired plurality of images;
access sensor data generated by the one or more sensors;
determine a current pose of the system in the surrounding environment based on the one or more features in the generated map and the accessed sensor data; and
upon determining the current pose of the system, transitioning to a single camera of the plurality of cameras, wherein subsequent images taken by the single camera are used to update the pose of the system in the surrounding environment.

2. The system of claim 1, wherein the physical processor further implements one or more computer vision algorithms to identify the features in the acquired images.

3. The system of claim 2, wherein the physical processor triangulates the position of the system using one or more of the identified features in the acquired images.

4. The system of claim 2, wherein determining the current pose of the system in the surrounding environment based on the features in the generated map and the accessed sensor data is performed without line of sight between the system and an HMD of an artificial-reality system.

5. The system of claim 1, wherein the system includes at least two cameras and wherein the physical processor implements the one or more images captured by the at least two cameras as part of a two-camera baseline to identify a three-dimensional (3D) position of a specified feature of the surrounding environment.

6. The system of claim 1, wherein the physical processor is configured to continually identify new features of the surrounding environment from the acquired images and add those new features to the generated map.

7. The system of claim 6, wherein the physical processor determines the current pose of the system in the surrounding environment based on the newly identified features in the generated map.

8. The system of claim 1, further comprising a head-mounted display (HMD) of an artificial-reality system.

9. The system of claim 8, wherein the physical processor is configured to:
determine whether one or more conditions exist that would cause the system to consult portions of an alternative map of the surrounding environment; and
upon determining that at least one of the one or more conditions exist, accessing at least a portion of the alternative map of the surrounding environment.

10. The system of claim 9, wherein the alternative map of the surrounding environment is generated by the artificial-reality system.

11. The system of claim 8, wherein the physical processor is configured to:
determine whether one or more conditions exist that would cause the system to combine portions of an alternative map of the surrounding environment with the generated map; and
upon determining that at least one of the one or more conditions exist, combining one or more portions of the alternative map with the generated map.

12. The system of claim 11, wherein the physical processor determines the current pose of the system in the surrounding environment based on the features in the combined map and the accessed sensor data.

13. An electronic device comprising:
a housing dimensioned to secure one or more components including at least one physical processor and one or more sensors;
at least one camera mounted to the housing; and
physical memory comprising computer-executable instructions that, when executed by the at least one physical processor, cause the at least one physical processor to:
acquire one or more images of a surrounding environment using the at least one camera mounted to the housing;
identify one or more features of the surrounding environment from the acquired one or more images;
generate a map using the one or more features identified from the acquired one or more images;
access sensor data generated by the one or more sensors;
determine a current pose of the electronic device in the surrounding environment based on the one or more features in the generated map and the accessed sensor data; and
upon determining the current pose of the system, transition to a single camera of the plurality of cameras, wherein subsequent images taken by the single camera are used to update the pose of the system in the surrounding environment.

14. The electronic device of claim 13, wherein the apparatus comprises a handheld electronic device controller.

15. The electronic device of claim 13, wherein the physical processor distributes at least a portion of computing tasks related to identifying the one or more features of the surrounding environment from the acquired images to one or more external computer systems.

16. The electronic device of claim 13, further comprising a communications module including a wireless transceiver, and wherein the physical processor implements the communications module to communicate with a peripheral device.

17. The electronic device of claim 16, wherein the apparatus and the peripheral device exchange image data, and wherein the physical processor updates the generated map using image data received from the peripheral device.

18. The electronic device of claim 17, wherein the image data received from the peripheral device is used by the physical processor to determine an updated pose of the apparatus upon the apparatus losing its position within the surrounding environment.

19. The electronic device of claim 13, wherein the physical processor is further configured to identify at least one of the features of the surrounding environment as being private and obfuscating those features within the generated map.

20. A non-transitory computer-readable medium comprising one or more computer-executable instructions that, when executed by at least one processor of a computing device, cause the computing device to:
  acquire one or more images of a surrounding environment using a camera mounted to a housing;
  identify one or more features of the surrounding environment from the acquired one or more images;
  generate a map using the one or more features identified from the acquired one or more images;
  access sensor data generated by one or more sensors;
  determine a current pose of the housing in the surrounding environment based on the one or more features in the generated map and the accessed sensor data; and
  upon determining the current pose of the system, transition to a single camera of the plurality of cameras, wherein subsequent images taken by the single camera are used to update the pose of the system in the surrounding environment.

* * * * *